US012435125B2

(12) United States Patent
Iyer et al.

(10) Patent No.: US 12,435,125 B2
(45) Date of Patent: Oct. 7, 2025

(54) HYPERIMMUNIZED EGG PRODUCT FOR TREATING OR PREVENTING ALCOHOLIC LIVER DISEASE AND GRAFT-VERSUS-HOST DISEASE

(71) Applicant: Prodigy Biotech, West Chester, PA (US)

(72) Inventors: Subramanian V. Iyer, Royal Palm Beach, FL (US); Sunny Patel, Stirling, NJ (US)

(73) Assignee: Prodigy Biotech, West Chester, PA (US)

( * ) Notice: Subject to any disclaimer, the term of this patent is extended or adjusted under 35 U.S.C. 154(b) by 0 days.

(21) Appl. No.: 18/555,338

(22) PCT Filed: Apr. 15, 2022

(86) PCT No.: PCT/US2022/024946
§ 371 (c)(1),
(2) Date: Oct. 13, 2023

(87) PCT Pub. No.: WO2022/221616
PCT Pub. Date: Oct. 20, 2022

(65) Prior Publication Data
US 2024/0199723 A1 Jun. 20, 2024

Related U.S. Application Data

(60) Provisional application No. 63/175,603, filed on Apr. 16, 2021.

(51) Int. Cl.
| C07K 16/02 | (2006.01) |
| A61K 9/00 | (2006.01) |
| A61K 39/00 | (2006.01) |
| A61P 1/16 | (2006.01) |
| C07K 16/12 | (2006.01) |

(52) U.S. Cl.
CPC ............ *C07K 16/02* (2013.01); *A61K 9/0053* (2013.01); *A61P 1/16* (2018.01); *C07K 16/1228* (2013.01); *A61K 2039/505* (2013.01); *A61K 2039/545* (2013.01); *C07K 2317/11* (2013.01)

(58) Field of Classification Search
None
See application file for complete search history.

(56) References Cited

U.S. PATENT DOCUMENTS

| 4,748,018 A | 5/1988 | Stolle et al. |
| 5,367,054 A | 11/1994 | Lee |
| 5,772,999 A | 6/1998 | Greenblatt et al. |
| 6,803,035 B2 | 10/2004 | Greenblatt et al. |
| 7,105,158 B1 | 9/2006 | D'Souza et al. |
| 2004/0156857 A1 | 8/2004 | Adalsteinsson et al. |
| 2006/0165661 A1* | 7/2006 | Speelmans .............. A23L 33/40 424/93.4 |
| 2017/0368113 A1 | 12/2017 | Crum et al. |

FOREIGN PATENT DOCUMENTS

| WO | 2010125565 | 11/2010 |
| WO | 2012071346 | 5/2012 |

OTHER PUBLICATIONS

Ha"llgren et al., Molecular detection of aggregation substance, enterococcal surface protein, and cytolysin genes and in vitro adhesion to urinary catheters of Enterococcus faecalis and E. faecium of clinical origin. International Journal of Medical Microbiology 299:323-332, 2009.*
Written Opinion based on PCT International Application No. PCT/US2022/024946, dated Jul. 26, 2022; pp. 1-7.
International Search Report based on PCT International Application No. PCT/US2022/024946, dated Jul. 26, 2022; pp. 1-7.
Stein-Thoeringer, et al., "Lactose Drives Enterococcus Expansion to Promote Graft-Versus-Host Disease", Science, Nov. 29, 2019, vol. 366, pp. 1-17.
Duan, Yi, et al., "Bacteriophage Targeting of Gut Bacterium Attenuates Alcoholic Liver Disease", Nature, Nov. 21, 2019, vol. 575 pp. 505-532.
Garrett, Wendy S., "Enterococcus in Graft-Versus-Host Disease", The New England Journal of Medicine, Mar. 12, 2020, vol. 382, No. 11, pp. 1064-1066.
Van Tyne, Daria, et al., "Structure, Function, and Biology of the Enterococcus faecalis Cytolysin", Toxins Apr. 29, 2013, vol. 5, pp. 895-911.

* cited by examiner

*Primary Examiner* — Ruixiang Li
(74) *Attorney, Agent, or Firm* — McCarter & English, LLP

(57) ABSTRACT

In one aspect, the present disclosure is directed to a method for preventing or treating alcoholic liver disease or graft-versus-host disease in a subject in need thereof, comprising administering to the subject a therapeutically effective amount of a hyperimmunized egg product obtained from an egg-producing animal, thereby preventing or treating the alcoholic liver disease or the graft-versus-host disease in the subject, wherein the hyperimmunized egg product comprises a therapeutically effective amount of one or more antibodies to an antigen selected from the group consisting of *Enterococcus faecalis*, *Enterococcus faecalis* cytolysin toxin, and *Enterococcus faecium*. The present disclosure is also directed to hyperimmunized eggs and egg products produced by an animal that has been hyperimmunized with an antigen selected from the group consisting of *Enterococcus faecalis*, isolated *Enterococcus faecalis* cytolysin toxin, and *Enterococcus faecium*. Methods of preparing the hyperimmunized eggs and egg products are also disclosed.

10 Claims, 8 Drawing Sheets
Specification includes a Sequence Listing.

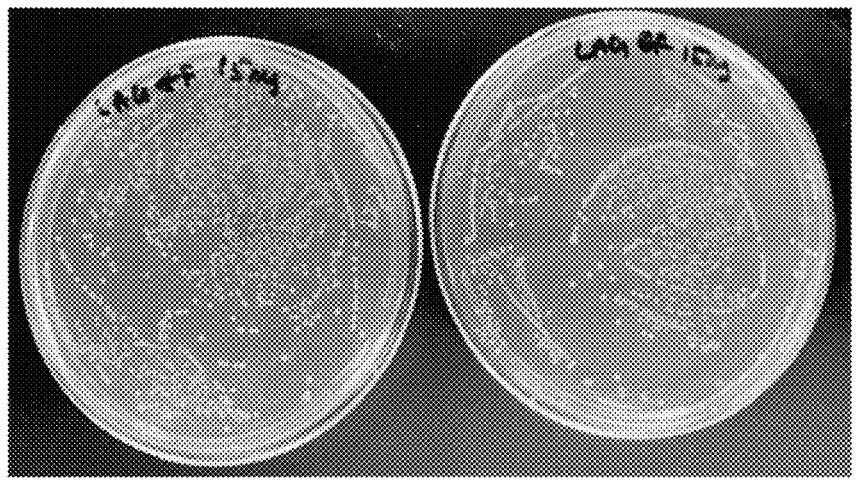
E. faecalis treated with 15 mg/ml IgY
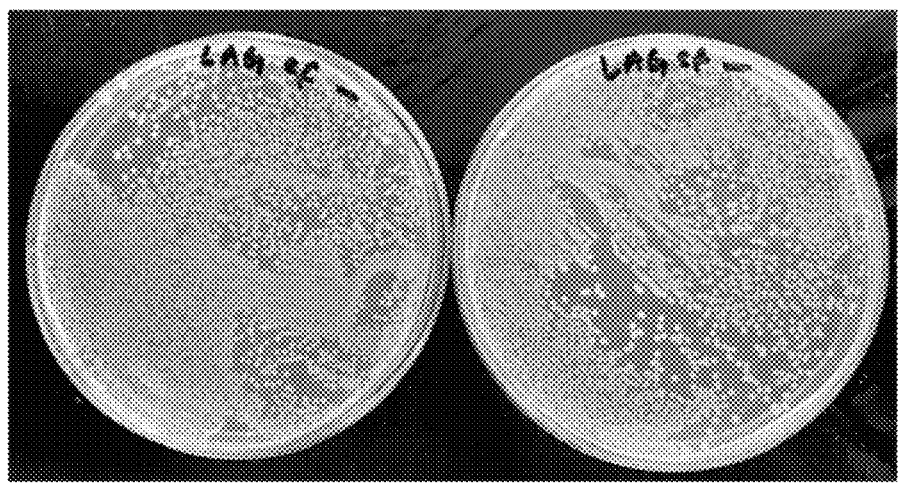
E. faecalis untreated
FIG. 4

FIG. 6A-E

HYPERIMMUNIZED EGG PRODUCT FOR TREATING OR PREVENTING ALCOHOLIC LIVER DISEASE AND GRAFT-VERSUS-HOST DISEASE

RELATED APPLICATIONS

This application a 35 U.S.C. § 371 national stage filing of International Application No. PCT/US2022/024946, filed on Apr. 16, 2022, which in turn claims priority to U.S. Provisional Patent Application No. 63/175,603, filed on Apr. 16, 2021, the contents of each of which are incorporated by reference herein in their entirety.

SEQUENCE LISTING

The Sequence Listing associated with this application is filed in electronic format via EFS-Web and hereby incorporated by reference in the specification in its entirety. The name of the text file containing the Sequence Listing is. The size of the text file is 1051 bytes, and the text file was created on Oct. 9, 2023.

BACKGROUND

Alcoholic liver disease (ALD) encompasses the liver manifestations of alcohol overconsumption, including fatty liver, alcoholic hepatitis, and chronic hepatitis with liver fibrosis or cirrhosis. The most severe form of alcoholic liver disease is alcoholic hepatitis; mortality ranges from 20% to 40% at 1-6 months, and as many as 75% of patients die within 90 days of a diagnosis of severe alcoholic hepatitis. See Duan et al., 2019, Nature 575: 505-511. Therapy with corticosteroids is only marginally effective. Early liver transplantation is the only curative therapy, but is offered only at select centers and to a limited group of patients. See Duan et al., cited above.

Graft-versus-host disease (GVHD) affects the skin, liver, and gastrointestinal tract and occurs when donor T cells recognize recipient tissue as foreign and trigger tissue inflammation and injury. Preventive and therapeutic strategies for GVHD are active areas of investigation. See Garrett, 2020, New England Journal of Medicine 382(11): 1064-1066. Accordingly, a need exists for improved methods of treating or preventing ALD and GVHD.

SUMMARY OF THE INVENTION

In certain aspects the disclosure relates to a method for preventing or treating alcoholic liver disease in a subject in need thereof, comprising administering to the subject a therapeutically effective amount of a hyperimmunized egg product obtained from an egg-producing animal, thereby preventing or treating the alcoholic liver disease in the subject, wherein the hyperimmunized egg product comprises a therapeutically effective amount of one or more antibodies to an antigen selected from the group consisting of *Enterococcus faecalis* and *Enterococcus faecalis* cytolysin toxin.

In certain aspects the disclosure relates to a method for preventing or treating graft-versus-host disease in a subject in need thereof, comprising administering to the subject a therapeutically effective amount of a hyperimmunized egg product obtained from an egg-producing animal, thereby preventing or treating the graft-versus-host disease in the subject, wherein the hyperimmunized egg product comprises a therapeutically effective amount of one or more antibodies to an antigen selected from the group consisting of *Enterococcus faecalis, Enterococcus faecalis* cytolysin toxin, and *Enterococcus faecium*.

In certain embodiments, the hyperimmunized egg product comprises a therapeutically effective amount of one or more antibodies to *Enterococcus faecalis*, and a therapeutically effective amount of one or more antibodies to *Enterococcus faecalis* cytolysin toxin. In certain embodiments, the method further comprises hyperimmunizing the egg-producing animal with an antigen selected from the group consisting of *Enterococcus faecalis*, isolated *Enterococcus faecalis* cytolysin toxin, and *Enterococcus faecium*. In certain embodiments, the method further comprises collecting a hyperimmunized egg from the egg-producing animal that has been hyperimmunized, and preparing a hyperimmunized egg product from the hyperimmunized egg.

In certain embodiments, the hyperimmunized egg product comprises at least 20% more by weight of an IgY antibody specific to an antigen selected from the group consisting of *Enterococcus faecalis, Enterococcus faecalis* cytolysin toxin, and *Enterococcus faecium* relative to a control egg product obtained from an egg-producing animal that is not hyperimmunized. In certain embodiments, the hyperimmunized egg product is administered to the subject 1 to 4 times per day. In certain embodiments, the hyperimmunized egg product is administered orally or intravenously. In certain embodiments, administration of the hyperimmunized egg product to the subject reduces the level of *Enterococcus faecalis* in the subject relative to a subject that is not administered the hyperimmunized egg product. In certain embodiments, administration of the hyperimmunized egg product to the subject reduces liver injury in the subject relative to a subject that is not administered the hyperimmunized egg product. In certain embodiments, the subject is a human.

In certain aspects the disclosure relates to a hyperimmunized egg produced by an animal that has been hyperimmunized with an antigen selected from the group consisting of *Enterococcus faecalis*, isolated *Enterococcus faecalis* cytolysin toxin, and *Enterococcus faecium*, wherein the level of antibodies to the antigen in the hyperimmunized egg is increased relative to an egg from an animal that has not been hyperimmunized. In certain embodiments, the animal has been hyperimmunized with *Enterococcus faecalis* and isolated *Enterococcus faecalis* cytolysin toxin, and wherein the level of antibodies to the *Enterococcus faecalis* and the isolated *Enterococcus faecalis* cytolysin toxin is increased relative to an egg from an animal that has not been hyperimmunized.

In certain aspects the disclosure relates to a hyperimmunized egg product obtained from a hyperimmunized egg described herein. In certain embodiments, the hyperimmunized egg product is whole egg. In certain embodiments, the hyperimmunized egg product is egg yolk. In certain embodiments, the hyperimmunized egg product is purified or partially purified IgY antibody to *Enterococcus faecalis* cytolysin toxin. In certain embodiments, the hyperimmunized egg product is purified or partially purified IgY antibody to *Enterococcus faecalis*. In certain embodiments, the hyperimmunized egg product consists of purified or partially purified IgY antibody to *Enterococcus faecalis* and purified or partially purified IgY antibody to *Enterococcus faecalis* cytolysin toxin.

In certain aspects the disclosure relates to a pharmaceutical composition comprising the hyperimmunized egg product as described herein and a pharmaceutically acceptable carrier. In certain embodiments, the composition comprises 3 to 10 grams of the whole egg. In certain embodiments, the composition comprises 1 to 3 grams of the egg yolk. In certain embodiments, the composition comprises 0.05 to 1 gram of the purified or partially purified IgY. In certain embodiments, the pharmaceutical composition is formulated for oral administration. In certain embodiments, the hyperimmunized egg product is formulated in nanoparticles or in an emulsion. In certain embodiments, the pharmaceutical composition is formulated for intravenous administration.

In certain aspects the disclosure relates to a method of preparing a hyperimmunized egg product comprising: i) hyperimmunizing an egg-producing animal with an antigen selected from the group consisting of *Enterococcus faecalis*, isolated *Enterococcus faecalis* cytolysin toxin, and *Enterococcus faecium*; and ii) preparing a hyperimmunized egg product from one or more eggs produced by the animal. In certain embodiments, the antigen is selected from the group consisting of isolated *Enterococcus faecalis* cytolysin toxin, and *Enterococcus faecium*. In certain embodiments, the antigen is selected from the group consisting of *Enterococcus faecalis* and isolated *Enterococcus faecalis* cytolysin toxin. In certain embodiments, the antigen comprises *Enterococcus faecalis* and isolated *Enterococcus faecalis* cytolysin toxin. In certain embodiments, the egg-producing animal is a chicken.

BRIEF DESCRIPTION OF THE FIGURES

FIG. 4 shows the inhibitory effects of anti-*Enterococcus faecalis* and anti-cytolysin IgY on growth of *E. faecalis*. Untreated and whole *E. faecalis* bacteria treated with 15 mg/ml of IgY was incubated for 24 h incubation at 37° C. The cultures were serially diluted, and diluted $10^4$ fold and plated on BHI agar plates. After overnight incubation, colonies were counted using ImageJ Count.

DETAILED DESCRIPTION

Figure 1:
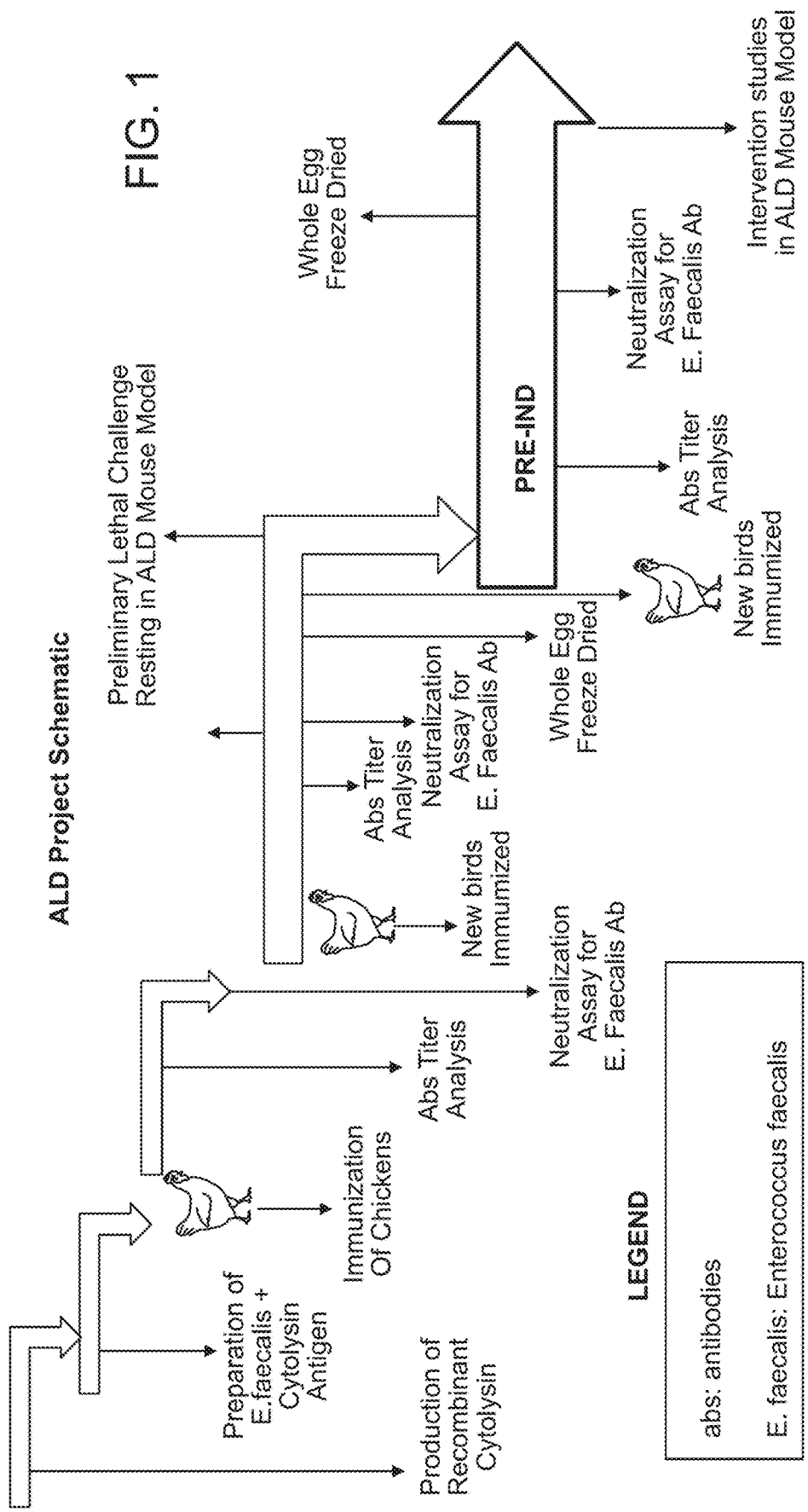
FIG. 1 shows a schematic of an experiment evaluating anti-*Enterococcus faecalis* and anti-cytolysin IgY antibodies in an Alcoholic Liver Disease Mouse Model.

The term "hyperimmunization" means repeated exposure to one or more antigens such that an immune response is elevated and maintained above the natural unexposed state.

A "hyperimmune state" refers to an elevated immune response in an egg producing animal that has been hyperimmunized.

The term "egg" as used herein refers to a whole egg (table, hyperimmunized or otherwise). The term "egg product" as used herein refers to a whole egg or any product or fraction obtained from a whole egg. In a particular embodiment, the egg product is an egg yolk, for example, an egg yolk powder. In another embodiment, the egg product is an egg white, for example, an egg white powder. In another embodiment, the egg product is obtained from a whole egg, for example, a whole egg powder (e.g. a spray-dried whole egg powder).

The term "control egg" refers to an egg obtained from an egg-producing that is not maintained in a hyperimmunized state, i.e. an animal that has not been hyperimmunized. The term "control egg product" refers to a control egg or an egg product obtained from a control egg.

The term "hyperimmunized egg" refers to a whole egg obtained from an egg-producing animal maintained in a hyperimmune state, i.e. an egg-producing animal that has been hyperimmunized.

The term "hyperimmunized egg product" refers to a hyperimmunized egg or any product obtained from a hyperimmunized egg. In certain embodiments, the hyperimmunized egg product is a concentrate. As used herein the term "concentrate" refers to a hyperimmunized egg product that is at least partially purified, such that the concentration of antibodies in the concentrate is greater than the concentration of antibodies in a hyperimmunized egg.

The term "egg powder" refers to a whole egg that has been dried. In some embodiments, the egg powder is spray-dried.

The term "egg-producing animal" means any oviparous animal, and includes any animal that lays an egg, such as avians, fish and reptiles.

The term "avian" refers to an animal that is a member of the class Aves. Avians include, but are not limited to, chickens, turkeys, geese, ducks, pheasants, quail, pigeons and ostriches.

The term "supranormal levels" means levels in excess of those found in eggs of egg-producing animals that are not hyperimmunized. For example, supranormal levels of an antibody to a particular antigen are levels of the antibody in excess of those found in eggs of egg-producing animals that are not hyperimmunized with the particular antigen.

The term "administer" means any method of providing a subject with a substance, including orally, intranasally, parenterally (intravenously, intramuscularly, or subcutaneously), rectally, topically or intraocularly.

The term "antigen" refers to a substance that is able to induce a humoral antibody and/or cell-mediated immune response rather than immunological tolerance. The term signifies the ability to stimulate an immune response as well as react with the products of it, e.g., an antibody.

As used herein, an "antibody" is a protein that includes at least one complementarity determining region that binds to a specific target antigen, e.g., an *Enterococcus faecalis* antigen, isolated *Enterococcus faecalis* cytolysin toxin, or an *Enterococcus faecium* antigen disclosed herein. For example, an antibody can include a heavy (H) chain variable region (abbreviated herein as VH), and a light (L) chain variable region (abbreviated herein as VL). In another example, an antibody includes two heavy (H) chain variable regions and two light (L) chain variable regions. In a particular embodiment, the antibody is a polyclonal antibody. The term "polyclonal antibody", as used herein, refers to a population of antibody molecules that that are capable of immunoreacting with different epitopes on a particular antigen. In a particular embodiment, the antibody is an IgY antibody.

As used herein, the terms "alcoholic liver disease", "ALD", "alcohol-associated liver disease" and "alcohol-related liver disease" refer to the liver manifestations of alcohol overconsumption, including fatty liver (steatosis), alcoholic hepatitis, and chronic hepatitis with liver fibrosis or cirrhosis. "Alcohol-related disorders" as used herein refers to diseases and disorders related to alcohol consumption and include, but are not limited to, alcohol-induced psychotic disorder, with delusions; alcohol abuse; excessive drinking; heavy drinking; problem drinking; alcohol intoxication; alcohol withdrawal; alcohol intoxication delirium; alcohol withdrawal delirium; alcohol-induced persisting dementia; alcohol-induced persisting amnestic disorder; alcohol dependence; alcohol-induced psychotic disorder, with hallucinations; alcohol-induced mood disorder; alcohol-induced or associated bipolar disorder; alcohol-induced or associated post-traumatic stress disorder; alcohol-induced anxiety disorder; alcohol-induced sexual dysfunction; alcohol-induced sleep disorder; and alcohol-related disorder not otherwise specified (NOS).

The term "alcohol abuser", as used herein, refers to a subject who meets DSM IV criteria for alcohol abuse (i.e., "repeated use despite recurrent adverse consequences") but is not dependent on alcohol.

The term "excessive drinker," as used herein, refers to men who drink more than 21 standard drinks per week and women who consume more than 14 standard drinks per week. One standard drink is 0.5 ounces (15 ml) of absolute alcohol, equivalent to 10 ounces (300 ml) of beer, 4 ounces (120 ml) of wine, or 1 ounce (30 ml) of 100-proof liquor. These individuals are not dependent on alcohol but may or may not meet DSM IV criteria for alcohol abuse.

The term "heavy drinker," as used herein, refers to men who drink more than 14 standard drinks per week and women who consume more than 7 standard drinks per week. These individuals are not dependent on alcohol but may or may not meet DSM IV criteria for alcohol abuse.

As used herein, the term "effective amount" or "therapeutically effective amount" as used herein refers to the amount of hyperimmunized egg product which when administered to a subject is sufficient to prevent or treat a disorder, e.g., alcoholic liver disease (ALD) or graft-vs-host disease (GVHD). The effective amount can vary depending, for example, on the age, weight, and/or health of the subject to be treated.

The term "isolated" as used herein refers to a biological compound (e.g., a protein) that is purified or partially purified from the cell in which it was produced. For example, an isolated *Enterococcus faecalis* cytolysin toxin is purified or partially purified from the *Enterococcus faecalis* cell in which it was produced. In some embodiments, the isolated *Enterococcus faecalis* cytolysin toxin is a recombinant *Enterococcus faecalis* cytolysin toxin, e.g., an *Enterococcus faecalis* cytolysin toxin that is produced in a cell other than an *Enterococcus faecalis* cell.

Alcoholic Liver Disease (ALD)

Eighty percent of alcohol passes through the liver to be detoxified. Chronic consumption of alcohol results in the secretion of pro-inflammatory cytokines (e.g. TNF-alpha, Interleukin 6 and Interleukin 8), oxidative stress, lipid peroxidation, and acetaldehyde toxicity. These factors cause inflammation, apoptosis and eventually fibrosis of liver cells, leading to alcoholic liver disease (ALD). ALD includes fatty liver (steatosis), alcoholic hepatitis, and chronic hepatitis with liver fibrosis or cirrhosis.

Fatty liver, or steatosis, is the accumulation of fatty acids in liver cells. Heavy alcohol consumption causes development of large fatty globules (macro vesicular steatosis) throughout the liver. Alcohol is metabolized by alcohol dehydrogenase (ADH) into acetaldehyde, then further metabolized by aldehyde dehydrogenase (ALDH) into acetic acid, which is finally oxidized into carbon dioxide and water. This process generates NADH, and increases the NADH/NAD+ ratio. A higher NADH concentration induces fatty acid synthesis, while a decreased NAD level results in decreased fatty acid oxidation. Subsequently, the higher levels of fatty acids signal the liver cells to compound it to glycerol to form triglycerides. These triglycerides accumulate, resulting in fatty liver.

Alcoholic hepatitis is characterized by the inflammation of hepatocytes, which appears to predispose the liver to fibrosis Inflammatory cytokines (TNF-alpha, IL6 and IL8) are thought to be essential in the initiation and perpetuation of liver injury by inducing apoptosis and necrosis. One possible mechanism for the increased activity of TNF-α is the increased intestinal permeability due to liver disease. This facilitates the absorption of the gut-produced endotoxin into the portal circulation. The Kupffer cells of the liver then phagocytose endotoxin, stimulating the release of TNF-α. TNF-α then triggers apoptotic pathways through the activation of caspases, resulting in liver cell death.

Cirrhosis is a late stage of serious liver disease marked by inflammation (swelling), fibrosis (cellular hardening) and damaged membranes preventing detoxification of chemicals in the body, ending in scarring and necrosis (cell death). Acetaldehyde may be responsible for alcohol-induced fibrosis by stimulating collagen deposition by hepatic stellate cells. The production of oxidants derived from NADPH oxidase and/or cytochrome P-450 2E1 and the formation of acetaldehyde-protein adducts damage the cell membrane. Symptoms include jaundice (yellowing), liver enlargement, and pain and tenderness from the structural changes in damaged liver architecture. Without total abstinence from alcohol use, cirrhosis will eventually lead to liver failure.

Chronic liver disease due to alcohol-use disorder contributes markedly to the global burden of disease and mortality. The most severe form of alcohol-related liver disease is alcoholic hepatitis (AH); mortality ranges from 20% to 40% at 1-6 months. It was recently demonstrated that the disease is more severe in a subset of alcoholic hepatitis patients (about 30%) who harbor *Enterococcus faecalis* that produce a toxin called cytolysin. While *E. faecalis* is present in the microbiome of non-alcoholic persons at a low level, at about 0.1-0.5% of the person's microbiome, in patients who have alcoholic liver disease (ALD) its abundance is greatly expanded to about 5%. Seventy-five percent of alcoholic hepatitis patients whose microbiome is abundant in cytolysin-positive *E. faecalis* die within 90 days following diagnosis of severe alcoholic hepatitis (Maddrey, et al., 1978, Gastroenterology 75, 193-199). Standard of Care therapy with corticosteroids is only marginally effective (Thursz, et al., 2015, N. Engl. J. Med. 372, 1619-1628). Early liver transplantation and abstinence from alcohol is the only effective therapy but is available only to a limited group of patients (Mathurin, et al., 2012, Management of alcoholic hepatitis. J. Hepatol. 56, S39-S45).

Duan et al. (2019, Nature 575:505-511) have shown the effectiveness of bacteriophages that target cytolysin-positive *E. faecalis* in humanized mice that were colonized with bacteria with feces of patients with alcoholic hepatitis, in preventing disease progression. It was demonstrated that treatment with bacteriophages that lyse cytolysin-positive *E. faecalis* decrease cytolysin in the liver and prevent progression of ethanol-induced liver disease in these humanized mice.

Graft-Versus-Host Disease (GVHD)

GVHD is a major complication after transplantation of solid organs and stem cells, such as those that occur with bone marrow transplants. White blood cells of the donor's immune system which remain within the donated tissue (the graft) recognize the recipient (the host) as foreign. The white blood cells present within the transplanted tissue then attack the recipient's body's cells, which leads to GVHD. See Hoffmann et al., 2002, J. Exp. Med. 196(3): 389-399. GVHD may occur in acute and chronic forms. The acute form of the disease is normally observed within the first 100 days post-transplant, and is a major challenge to transplants owing to associated morbidity and mortality. The chronic form of GVHD normally occurs after 100 days. The appearance of moderate to severe cases of chronic GVHD adversely influences long-term survival.

Acute GVHD (aGVHD) affects the skin, liver, and gastrointestinal tract and occurs when donor T cells recognize recipient tissue as foreign and trigger tissue inflammation and injury. Specifically, aGVHD is initiated by alloreactive donor T cells that recognize MHC class I and II molecules on the surface of host cells as well as peptides presented by them. The infiltration of several target organs such as gut, liver, and skin by donor leukocytes including T cells is thought to be one of the key processes in the early phase of aGVHD. The activation and expansion of the donor T cells, leading to the secretion of proinflammatory cytokines and the recruitment of additional inflammatory effector cells to these sites, further damages the affected tissues. See Hoffmann et al., cited above.

*Enterococcus faecalis* and Cytolysin and ALD

The gut microbiota promote alcoholic liver disease in mice, but little is known about the microbial factors that are responsible for this process. Recently, cytolysin, a two-subunit exotoxin that is secreted by *Enterococcus faecalis*, has been identified as a cause of hepatocyte death and liver injury. See Duan et al., 2019, Nature 575: 505-511, which is incorporated by reference herein in its entirety. *Enterococcus faecalis* is a Gram-positive, non-spore-forming commensal bacterium inhabiting the gastrointestinal tracts of humans and other mammals.

Highly virulent strains of *E. faecalis* express a pore-forming exotoxin, called cytolysin, which lyses both bacterial and eukaryotic cells in response to quorum signals. Compared with non-alcoholic individuals or patients with alcohol-use disorder, patients with alcoholic hepatitis have increased fecal numbers of *E. faecalis*. The presence of cytolysin-positive (cytolytic) *E. faecalis* correlated with the severity of alcoholic liver disease and with mortality in patients with alcoholic hepatitis. Furthermore, bacteriophages that target cytolytic *E. faecalis* decrease cytolysin in the liver and abolish ethanol-induced liver disease in humanized mice. See Duan et al., cited above.

The functional cytolysin toxin consists of large and small subunit oligopeptides, encoded by the genes $cylL_L$ and $cylL_S$, respectively. The *E. faecalis* cytolysin components $CylL_L$ and $CylL_S$ have been classified as Type-A, pore-forming antibiotics, and more recently as two-component, Class II antibiotics. Antibiotics are complex polycyclic antimicrobial peptides, which are ribosomally synthesized by Gram-positive bacteria and are characterized by the presence of lanthionine and methyllanthionine bridges between dehydrated serine and threonine residues and cysteine thiols. Antibiotics have extremely varied structures and functions, but they are all characterized by undergoing extensive post-translational modification and possessing either antibiotic or morphogenic activities. Cytolysin appears to be unique among antibiotics, in that it can lyse other bacteria as well as erythrocytes and other eukaryotic cells. See Van Tyne et al., 2013, Toxins 5(5): 895-911.

The amino acid sequences of $CylL_L$ and $CylL_S$ are provided below:

```
CylL_L
                                          (SEQ ID NO: 1)
TTPVCAVAATAAASSAACGWVGGGIFTGVTVVVSLKHC

CylL_S
                                          (SEQ ID NO: 2)
TTPACFTIGLGVGALFSAKFC
```

*Enterococcus* and GVHD

There is increasing evidence that a patient's gut microbiota may play a role in susceptibility to GVHD, in particular acute GVHD that results from allogeneic hematopoietic cell transplantation. See Garrett, 2020, New England Journal of Medicine 382(11): 1064-1066, which is incorporated by reference herein in its entirety. Some enterococcal species in the gut (e.g., *Enterococcus faecalis* and *Enterococcus faecium*) are opportunistic pathogens that frequently cause life-threatening bloodstream infections in patients who have undergone allogeneic hematopoietic-cell transplantation. Studies have shown that Enterococci, in particular *E. faecium*, dominate fecal communities in a sizable subgroup of patients undergoing allogeneic hematopoietic cell transplantation, and that this enterococcal domination correlated with decreased overall survival and increased mortality from GVHD. See Stein-Thoeringer et al., 2019, Science 366: 1143-9, which is incorporated by reference herein in its entirety. Stein-Thoeringer et al. observed that the dietary sugar lactose drives enterococcal growth in a mouse model of GVHD, and that a lactose-free diet attenuated enterococcal expansion and T-cell-driven inflammation in GVHD.

Hyperimmunized Egg Product

In certain aspects, the present disclosure relates to a method of preparing a hyperimmunized egg product comprising: i) hyperimmunizing an egg-producing animal with an antigen selected from the group consisting of *Enterococ-*

*cus faecalis*, isolated *Enterococcus faecalis* cytolysin toxin, and *Enterococcus faecium*; and ii) preparing a hyperimmunized egg product from one or more eggs produced by the animal. In some embodiments, the antigen is selected from the group consisting of *Enterococcus faecalis* and isolated *Enterococcus faecalis* cytolysin toxin. In some embodiments, the antigen comprises *Enterococcus faecalis* and isolated *Enterococcus faecalis* cytolysin toxin.

Egg-producing animals produce antibodies in blood and eggs that are specific to particular immunogens. For example, various genera of the class Aves, such as chickens (*Gallus domesticus*), turkeys, and ducks produce antibodies against antigens associated with avian diseases. LeBacq-Verheyden et al. (Immunology 27:683 (1974)) and Leslie, G. A., et al. (J. Med. 130:1337 (1969)), have quantitatively analyzed immunoglobulins of the chicken. Polson, A., et. al. (Immunological Communications 9:495-514 (1980)) immunized hens against several proteins and natural mixtures of proteins, and detected IgY antibodies in the yolks of the eggs. Fertel, R., et al. (Biochemical and Biophysical Research Communications 102:1028-1033 (1981)) immunized hens against prostaglandins and detected antibodies in the egg yolk. Jensenius et al. (Journal of Immunological Methods 46:63-68 (1981)) provide a method of isolating egg yolk IgG for use in immunodiagnostics. Polson et al. (Immunological Communications 9:475-493 (1980)) describe antibodies isolated from the yolk of hens that were immunized with a variety of plant viruses.

U.S. Pat. No. 4,748,018 discloses a method of passive immunization of a mammal that comprises parenterally administering purified antibody obtained from the eggs of an avian that has been immunized against the corresponding antigen, and wherein the mammal has acquired immunity to the eggs. U.S. Pat. No. 5,772,999, assigned to DCV-Biologics, discloses a method of preventing, countering or reducing chronic gastrointestinal disorders or Non-Steroidal Anti-Inflammatory Drug-induced (NSAID-induced) gastrointestinal damage in a subject by administering hyperimmunized egg and/or milk or fractions thereof to the subject.

An immunized egg is an egg which comes from an avian which has been immunized with, for example, a specific antigen or mixture of antigens. A hyperimmunized egg is an egg which comes from an avian which has been brought to a specific state of immunization by means of, for example, periodic booster administrations of antigens. Hyperimmunized eggs, no matter the type of antigen their avian maker has been administered, have been found to have various beneficial factors, including, as mentioned above, the treatment of chronic gastrointestinal disorders, NSAID-induced gastrointestinal damage (see U.S. Pat. No. 5,772,999) and anti-inflammatory effects due to the presence of an anti-inflammatory composition (see U.S. Application Publication No. US 2004/0156857).

One of the advantages of the hyperimmunized egg product is that it would have a higher and more consistent level of antibodies (e.g. IgY antibodies) to *Enterococcus faecium*, *Enterococcus faecalis* or *Enterococcus faecalis* cytolysin toxin compared to a control egg product or an egg product from a chicken that has been immunized with *Enterococcus faecium*, *Enterococcus faecalis* or *Enterococcus faecalis* cytolysin toxin using standard immunization techniques. In some embodiments, the hyperimmunized egg product has higher levels of IgY antibodies to *Enterococcus faecalis* and/or isolated *Enterococcus faecalis* cytolysin toxin relative to a chicken that has been immunized with *Enterococcus faecalis* and/or *Enterococcus faecalis* cytolysin toxin using standard immunization techniques. Typically standard immunization consists of an initial immunization followed by one or two booster immunization at 30 day intervals. In some embodiments, hyperimmunization comprises at least 4, 5, 6, 7, 8, 9 or 10 immunizations with *Enterococcus faecium, Enterococcus faecalis* and/or *Enterococcus faecalis* cytolysin toxin as described herein. In some embodiments, hyperimmunization comprises immunizing an egg producing animal with *Enterococcus faecium, Enterococcus faecalis* and/or isolated *Enterococcus faecalis* cytolysin toxin described herein at intervals of less than 30 days, less than 25 days, less than 20 days, less than 15 days, less than 10 days, or less than 5 days.

The hyperimmunized egg product can be produced by any egg-producing animal. It is preferred that the animal be a member of the class Aves or, in other words, an avian. Within the class Aves, domesticated fowl are preferred, but other members of this class, such as turkeys, ducks, and geese, are a suitable source of hyperimmune egg product. In a particular embodiment, the egg-producing animal is a chicken.

This special state of hyperimmunization is preferably achieved by administering an initial immunization, followed by periodic boosters with sufficiently high doses of specific antigens or mixtures of antigens. The dosage of the booster may be 10%, 20%, 30%, 40%, 50%, 60%, 70%, 80%, 90% or 100% of the dosage necessary to produce primary immunization of the egg-producing animal. Any of these percentages may be used to define a range for the dosage of the booster immunization. For example, in some embodiments, the dosage of the booster is 20%-80%, 30%-70%, or 50%-100% of the dosage necessary to produce primary immunization of the egg-producing animal. In a particular embodiment, the dosage of the booster immunization is 50% of the dosage of the primary immunization. Having knowledge of the requirement for developing and maintaining a hyperimmune state, it is within the skill of the art to vary the amount of antigen administered, depending on the egg-producing animal genera and strain employed, in order to maintain the animal in the hyperimmune state.

The hyperimmune state may be produced by a single antigen or a combination of antigens. Hyperimmunization may be achieved by multiple exposures to multiple antigens, or multiple exposures to a single antigen.

Antigens for Hyperimmunization

In some embodiments, the antigens for hyperimmunization comprise one or more of *Enterococcus faecium, Enterococcus faecalis* and *Enterococcus faecalis* cytolysin toxin. In some embodiments, the egg producing animal is hyperimmunized only with *Enterococcus faecalis* i.e. no additional antigens are used for hyperimmunization. In some embodiments, the egg producing animal is hyperimmunized only with isolated *Enterococcus faecalis* cytolysin toxin. In some embodiments, the egg producing animal is hyperimmunized only with *Enterococcus faecium*.

In some embodiments, a hyperimmunized egg product comprising antibodies to *Enterococcus faecalis* is prepared by hyperimmunizing an egg producing animal with *Enterococcus faecalis*. In some embodiments, a hyperimmunized egg product comprising antibodies to *Enterococcus faecalis* cytolysin toxin is prepared by hyperimmunizing an egg producing animal with *Enterococcus faecalis* cytolysin toxin. In some embodiments, a hyperimmunized egg product comprising antibodies to *Enterococcus faecium* is prepared by hyperimmunizing an egg producing animal with *Enterococcus faecium*.

Any combination of the antigens disclosed herein may be used to hyperimmunize an egg producing animal. For example, in some embodiments, the egg-producing animal is hyperimmunized with *Enterococcus faecium, Enterococcus faecalis* and isolated *Enterococcus faecalis* cytolysin toxin. In some embodiments, the egg-producing animal is hyperimmunized with *Enterococcus faecium* and *Enterococcus faecalis*. In some embodiments, the egg-producing animal is hyperimmunized with *Enterococcus faecium* and isolated *Enterococcus faecalis* cytolysin toxin. In some embodiments, the egg-producing animal is hyperimmunized with *Enterococcus faecalis* and isolated *Enterococcus faecalis* cytolysin toxin.

Hyperimmunization Procedure

The following list of steps is an example of a preferred procedure used to bring an egg-producing animal to a heightened state of immunity from which the resultant hyperimmune egg or egg product can be administered to an avian:

1. Selecting one or more antigens.
2. Eliciting an immune response in the egg-producing animal by primary immunization.
3. Administering booster vaccines of one or more antigens of appropriate dosage to induce and maintain the hyperimmune state.

Step 1: The critical point in this step is that the antigen(s) must be capable of inducing immune and hyperimmune states in the egg-producing animal. In some embodiments, the egg-producing animal is immunized with *Enterococcus faecalis*. In some embodiments, the egg-producing animal is immunized with *Enterococcus faecalis* cytolysin toxin. In some embodiments, the egg producing animal is hyperimmunized with *Enterococcus faecium*. In some embodiments, the egg producing animal is hyperimmunized with two or more of *Enterococcus faecium, Enterococcus faecalis* and *Enterococcus faecalis* cytolysin toxin.

Step 2: For *Enterococcus faecalis* and *Enterococcus faecium*, the vaccine may be either a killed or live-attenuated vaccine. The vaccine may be administered by any method that elicits an immune response. It is preferred that immunization be accomplished by administering the vaccine through intramuscular injection. The preferred muscle for injection in an avian is the breast muscle. Dosage is preferably 0.05-5 milligrams of the immunogenic vaccine. Other methods of administration that can be used include intravenous injection, intraperitoneal injection, intradermal, rectal suppository, aerosol or oral administration.

It can be determined whether the vaccine has elicited an immune response in the egg-producing animal through a number of methods known to those having skill in the art of immunology. Examples of these include enzyme-linked immunosorbent assays (ELISA), tests for the presence of antibodies to the stimulating antigens, and tests designed to evaluate the ability of immune cells from the host to respond to the antigen. The minimum dosage of antigen necessary to induce an immune response depends on the vaccination procedure used, including the type of adjuvants and formulation of antigen(s) used as well as the type of egg-producing animal used as the host.

Step 3: The hyperimmune state is preferably induced and maintained in the target animal by repeated booster administrations of an appropriate dosage at fixed time intervals. The time intervals are preferably 2-8 week intervals over a period of 6-12 months. However, it is essential that the booster administrations do not lead to immune tolerance. Such processes are well known in the art. Methods of preparing the hyperimmunized egg product are described, for example, in U.S. Pat. No. 6,803,035, which is incorporated by reference herein in its entirety.

In a particular embodiment, an antigen (e.g. *Enterococcus faecium, Enterococcus faecalis* and/or *Enterococcus faecalis* cytolysin toxin) is formulated into a Freund's vaccine. In the first vaccination, the egg-producing animal receives two 0.5 ml doses of each antigen. Two weeks later, one 0.5 ml dose of each antigen is administered to the egg-producing animal as a booster vaccination. An additional booster vaccination is performed 4 weeks after the first vaccination. The vaccines may be administered to breast tissue.

It is possible to use other hyperimmunization maintenance procedures or combination of procedures, such as, for example, intramuscular injection for primary immunization and intravenous injection for booster injections. Further procedures include simultaneously administering microencapsulated and liquid antigen, or intramuscular injection for primary immunization, and booster dosages by oral administration or parenteral administration by microencapsulation means. Several combinations of primary and hyperimmunization are known to those skilled in the art.

In some embodiments, the hyperimmunized egg product comprises antibodies to *Enterococcus faecium*. In certain embodiments, the hyperimmunized egg product comprises antibodies to *Enterococcus faecalis*. In some embodiments, the hyperimmunized egg product comprises antibodies to *Enterococcus faecalis* cytolysin toxin. The antibodies to *Enterococcus faecalis* cytolysin toxin may bind to and neutralize the toxin. In some embodiments, the hyperimmunized egg product comprises antibodies to *Enterococcus faecalis* cytolysin toxin and antibodies to at least one additional *Enterococcus faecalis* antigen that is not *Enterococcus faecalis* cytolysin toxin.

The antibody may be an IgA, IgM or IgY antibody. In a particular embodiment, the antibody is an IgY antibody.

The hyperimmunized egg or hyperimmunized egg product may contain an increased level of an antibody (e.g., an IgY antibody) specific to a particular antigen disclosed herein relative to a control egg or control egg product obtained from an egg-producing animal that is not hyperimmunized with the particular antigen. For example, in some embodiments the hyperimmunized egg or hyperimmunized egg product contains an increased level of an antibody that is specific to *Enterococcus faecalis* relative to a control egg or egg product obtained from an egg-producing animal that is not hyperimmunized. In some embodiments, the hyperimmunized egg or hyperimmunized egg product contains an increased level of an antibody that is specific to *Enterococcus faecalis* cytolysin toxin relative to a control egg or egg product obtained from an egg-producing animal that is not hyperimmunized. In some embodiments the hyperimmunized egg or hyperimmunized egg product contains an increased level of an antibody that is specific to *Enterococcus faecium* relative to a control egg or egg product obtained from an egg-producing animal that is not hyperimmunized.

In some embodiments, the hyperimmunized egg or egg product comprises at least 10%, 20%, 30%, 40%, 50%, 100%, 200%, 300%, 400% or 500% more antibody (e.g. IgY antibody) specific to a particular antigen disclosed herein (for example *Enterococcus faecium, Enterococcus faecalis* or *Enterococcus faecalis* cytolysin toxin) by weight relative to a control egg or control egg product obtained from an egg-producing animal that is not hyperimmunized with the particular antigen. For example, in some embodiments, the hyperimmunized egg or hyperimmunized egg product comprises at least 10%, 20%, 30%, 40%, 50%, 100%, 200%, 300%, 400% or 500% more antibody (e.g. IgY antibody) specific to *Enterococcus faecalis* relative to a control egg or control egg product obtained from an egg-producing animal that is not hyperimmunized with *Enterococcus faecalis*. In some embodiments, the hyperimmunized egg or hyperimmunized egg product comprises at least 10%, 20%, 30%, 40%, 50%, 100%, 200%, 300%, 400% or 500% more antibody (e.g. IgY antibody) specific to *Enterococcus faecalis* cytolysin toxin relative to a control egg or control egg product obtained from an egg-producing animal that is not hyperimmunized with *Enterococcus faecalis* cytolysin toxin. In some embodiments, the hyperimmunized egg or hyperimmunized egg product comprises at least 10%, 20%, 30%, 40%, 50%, 100%, 200%, 300%, 400% or 500% more antibody (e.g. IgY antibody) specific to *Enterococcus faecium* relative to a control egg or control egg product obtained from an egg-producing animal that is not hyperimmunized with *Enterococcus faecium*.

Hyperimmunized eggs or egg products may contain an increased level of two or more antibodies (e.g. IgY antibodies), each of which is specific to a different antigen disclosed herein, relative to a control egg or egg product obtained from an egg-producing animal that is not hyperimmunized. For example, in some embodiments the hyperimmunized egg or hyperimmunized egg product contains an increased level of one or more antibodies that are specific to *Enterococcus faecalis* cytolysin toxin and one or more antibodies that are specific to *Enterococcus faecalis* (e.g., one or more antibodies that are specific to an *Enterococcus faecalis* antigen other than *Enterococcus faecalis* cytolysin toxin) relative to a control egg or egg product obtained from an egg-producing animal that is not hyperimmunized. In some embodiments, the hyperimmunized egg or hyperimmunized egg product contains an increased level of an antibody that is specific to *Enterococcus faecalis* cytolysin toxin and an increased level of an antibody that is specific to *Enterococcus faecium* relative to a control egg or egg product obtained from an egg-producing animal that is not hyperimmunized. In some embodiments the hyperimmunized egg or hyperimmunized egg product contains an increased level of an antibody that is specific to *Enterococcus faecium* and an increased level of an antibody that is specific to *Enterococcus faecalis* relative to a control egg or egg product obtained from an egg-producing animal that is not hyperimmunized.

For example, in some embodiments, the hyperimmunized egg or hyperimmunized egg product comprises at least 10%, 20%, 30%, 40%, 50%, 100%, 200%, 300%, 400% or 500% more antibody to *Enterococcus faecalis*, and at least 10%, 20%, 30%, 40%, 50%, 100%, 200%, 300%, 400% or 500% more antibody to *Enterococcus faecalis* cytolysin toxin relative to a control egg or control egg product obtained from an egg-producing animal that is not hyperimmunized with *Enterococcus faecalis* or *Enterococcus faecalis* cytolysin toxin. In some embodiments, the hyperimmunized egg or hyperimmunized egg product comprises at least 10%, 20%, 30%, 40%, 50%, 100%, 200%, 300%, 400% or 500% more antibody to *Enterococcus faecalis*, and at least 10%, 20%, 30%, 40%, 50%, 100%, 200%, 300%, 400% or 500% more antibody to *Enterococcus faecium* relative to a control egg or control egg product obtained from an egg-producing animal that is not hyperimmunized with *Enterococcus faecalis* or *Enterococcus faecium*. In some embodiments, the hyperimmunized egg or hyperimmunized egg product comprises at least 10%, 20%, 30%, 40%, 50%, 100%, 200%, 300%, 400% or 500% more antibody to *Enterococcus faecalis* cytolysin toxin, and at least 10%, 20%, 30%, 40%, 50%, 100%, 200%, 300%, 400% or 500% more antibody to *Enterococcus faecium* relative to a control egg or control egg product obtained from an egg-producing animal that is not hyperimmunized with *Enterococcus faecalis* cytolysin toxin or *Enterococcus faecium*. In some embodiments, the hyperimmunized egg or hyperimmunized egg product comprises at least 10%, 20%, 30%, 40%, 50%, 100%, 200%, 300%, 400% or 500% more antibody to *Enterococcus faecalis*, at least 10%, 20%, 30%, 40%, 50%, 100%, 200%, 300%, 400% or 500% more antibody to *Enterococcus faecalis* cytolysin toxin, and at least 10%, 20%, 30%, 40%, 50%, 100%, 200%, 300%, 400% or 500% more antibody to *Enterococcus faecium* relative to a control egg or control egg product obtained from an egg-producing animal that is not hyperimmunized with *Enterococcus faecalis*, *Enterococcus faecalis* cytolysin toxin or *Enterococcus faecium*.

Comparisons of antibody titers in hyperimmunized egg products and control egg products may be determined by methods known in the art. For example, in one embodiment, eggs are collected and the antibody titers are monitored by ELISA at regular intervals. To determine antibody titers, total IgY is extracted from eggs using Pierce™ Chicken IgY Purification Kit (Thermo Fisher Scientific, Waltham, MA). Briefly, 2 mL of egg is mixed with five volumes of delipidation reagent and IgY is purified following the manufacturer's instructions. Spray dried egg powder samples are reconstituted in sterile PBS at 1 mg/mL, and filtered through a 0.22 µm membrane filter. Specific antibody titers in the isolated IgY or egg powder samples are measured by ELISA. Flat bottom, 96-well microtiter plates (Corning® Costar®, Corning, NY) are coated with antigens (e.g., an *Enterococcus faecalis* antigen, isolated *Enterococcus faecalis* cytolysin toxin, or an *Enterococcus faecium* antigen) at 10 µg/mL (100 µL/well) and incubated overnight at 4° C. The plates are washed twice with PBS containing 0.05% Tween 20 (Sigma-Aldrich, St. Louis, MO) and blocked with 100 µL/well of PBS containing 1% Bovine Serum Albumin (BSA) and incubated for 1 h at RT. Serially diluted (in PBS with 0.1% BSA) IgY samples from egg powder samples are added to the plates in triplicate wells (100 µL/well) and incubated for 2 h at RT with constant shaking. The plates are then washed with PBS-T and treated with peroxidase-conjugated rabbit anti-chicken IgY (IgG) antibody (1:500; Sigma), incubated for 30 min, followed by color development for 10 minutes with 0.01% tetramethylbenzidine substrate (Sigma) in 0.05 M Phosphate-Citrate buffer, pH 5.0. Bound antibodies are detected by measuring optical density at 450 nm (OD450) using a microplate reader (Bio-Rad, Hercules, CA). Antibody titers may be expressed by the highest fold dilution of egg product that still contains detectable antibodies as measured by optical density as described above. For example, an antibody titer of 1000 would indicate that a 1000-fold dilution of the egg product contains detectable antibody, but higher dilutions do not contain detectable antibody. In some embodiments, the antibody titer (e.g., titer of antibodies to *Enterococcus faecalis* cytolysin toxin, *Enterococcus faecalis*, and/or *Enterococcus faecium*) in the hyperimmunized egg product is at least 1000, at least 2000, at least 4000, at least 8000, at least 16,000, at least 32,000, at least 64,000, at least 100,000, at least 128,000, at least 250,000, at least 500,000, or at least 1 million, 2 million, 3 million, 4 million, 5 million, 6 million, 7 million, 8 million, 9 million, 10 million, 11 million, 12 million, 13 million, 14 million, 15 million, 16 million, 17 million, 18 million, 19 million, or 20 million. In a particular embodiment, the antibody titer (e.g., titer of antibodies to *Enterococcus faecalis* cytolysin toxin, *Entero-*

*coccus faecalis*, and/or *Enterococcus faecium*) in the hyperimmunized egg product is at least 16,000. In a further particular embodiment, the titer of antibodies to *Enterococcus faecalis* cytolysin toxin and the titer of antibodies to *Enterococcus faecalis* in the hyperimmunized egg product is at least 16,000.

In some embodiments, the hyperimmunized egg or egg product comprises at least 0.0001%, 0.0005%, 0.001%, 0.005%, 0.01%, 0.05%, or 0.1% by weight of an IgY antibody to a specific antigen (for example, an *Enterococcus faecium* antigen, an *Enterococcus faecalis* antigen, or *Enterococcus faecalis* cytolysin toxin). Typically, a whole chicken egg weighs approximately 60 grams without the shell, with the egg yolk weighing approximately 20 grams and the egg white weighing approximately 40 grams. In some embodiments, 3 grams of egg yolk contains approximately 20-30 milligrams of total IgY, such that a whole egg contains about 150-200 mg total IgY. In some embodiments, at least 1%, 2%, 3%, 4%, 5%, 6%, 7%, 8%, 9%, 10%, 11%, 12%, 13%, 14%, 15%, 16%, 17%, 18%, 19%, 20%, 25% or 30% of the total IgY in the hyperimmunized egg or egg product is specific to one of the antigens used for hyperimmunization (e.g., *Enterococcus faecium*, *Enterococcus faecalis* or isolated *Enterococcus faecalis* cytolysin toxin).

Compositions and Administration

In certain aspects, the present disclosure relates to a method for preventing or treating alcoholic liver disease in a subject in need thereof, comprising administering to the subject a therapeutically effective amount of a hyperimmunized egg product obtained from an egg-producing animal, thereby preventing or treating the alcoholic liver disease in the subject, wherein the hyperimmunized egg product comprises a therapeutically effective amount of one or more antibodies to an antigen selected from the group consisting of *Enterococcus faecalis*, and *Enterococcus faecalis* cytolysin toxin. In some embodiments, the hyperimmunized egg product comprises a therapeutically effective amount of one or more antibodies to *Enterococcus faecalis* cytolysin toxin and one or more antibodies to *Enterococcus faecalis*. In some embodiments, the antibodies to *Enterococcus faecalis* include antibodies to one or more *Enterococcus faecalis* antigens that is not *Enterococcus faecalis* cytolysin toxin.

In certain aspects, the present disclosure relates to a method for preventing or treating graft-versus-host disease in a subject in need thereof, comprising administering to the subject a therapeutically effective amount of a hyperimmunized egg product obtained from an egg-producing animal, thereby preventing or treating the graft-versus-host disease in the subject, wherein the hyperimmunized egg product comprises a therapeutically effective amount of one or more antibodies to an antigen selected from the group consisting of *Enterococcus faecalis*, *Enterococcus faecalis* cytolysin toxin, and *Enterococcus faecium*. Once the egg-producing animals have been sufficiently hyperimmunized, it is preferred that the eggs from these animals are collected and processed to produce a hyperimmunized egg product in administrable form. The hyperimmunized egg product may be prepared by dehydration, spray drying, or freeze drying of whole egg, yolk or purified IgY fraction. The dried hyperimmunized egg product may be mixed with an agent such as silicon or silicon derivatives that improves flow properties. The dried hyperimmunized egg product may comprise a desiccant. The hyperimmunized egg product may be stored at ambient temperature or refrigerated, for example, at 4° C.

In some embodiments, administration of the hyperimmunized egg product to the subject reduces the level of *Enterococcus faecalis* in the subject, e.g., relative to the level of *Enterococcus faecalis* in the subject before administration of the hyperimmunized egg product, or relative to a subject that is not administered the hyperimmunized egg product. In some embodiments, administration of the hyperimmunized egg product to the subject reduces liver injury in the subject (e.g., reduces serum levels of alanine aminotransferase (ALT)), e.g., relative to the level of liver injury before administration of the hyperimmunized egg product, or relative to a subject that is not administered the hyperimmunized egg product.

In some embodiments the hyperimmunized egg product is encapsulated. Methods of encapsulating antibodies and other proteins are known in the art and are described, for example, in U.S. Pat. No. 7,105,158. Materials that are biodegradable and nonantigenic can be used as the encapsulating material. Encapsulating materials include, but are not limited to albumin, PLGA, globulin, natural and synthetic polymers, and thermoplastic polymers. Any polymer that is biocompatible and bioerodible may be used for encapsulation. A number of available crosslinking agents such as glutaraldehyde can be used to crosslink the encapsulating material. Additionally, the pharmaceutically delivered material may contain microspheres of encapsulated drug whereby the microspheres have different concentrations of crosslinking agent used, thereby creating a prolonged continuous release of the antibody.

In some embodiments, the hyperimmunized egg product is in the form of a microparticle or nanoparticle, for example, an encapsulated microparticle or encapsulated nanoparticle. The microparticles and nanoparticles can have any shape. Typically the microparticles and nanoparticles are spherical. Other suitable shapes include, but are not limited to, flakes, triangles, ovals, rods, polygons, needles, tubes, cubes and cuboid structures. In certain embodiments, the microparticles have a diameter of less than 10, 9, 8, 7, 6, 5, 4, 3, 2, 1, 0.9, 0.8, 0.7, 0.6, 0.5, 0.4, 0.3, 0.2 or 0.1 micron(s). Any of these values may be used to define a range for the diameter of the microparticle. For example the diameter of the microparticle may be from about 0.1 to about 10 microns, from about 0.1 to about 1 micron, or from about 0.1 to about 2 microns. In other embodiments, larger microparticles or particles may be used. For example the microparticles may have a diameter ranging from 10 microns to 1000 microns. In certain embodiments, the nanoparticles have a diameter of less than 1000, 900, 800, 700, 600, 500, 400, 300, 200, 100, or 10 nm. Any of these values may be used to define a range for the diameter of the nanoparticle. For example the diameter of the nanoparticle may be from about 10 to about 1000 nm, from about 100 to about 1000 nm, or from about 10 to about 100 nm.

There are several processes whereby microparticles or nanoparticles can be encapsulated, including, for example, multi-walled microencapsulation, hot melt encapsulation, phase separation encapsulation, spontaneous emulsion, solvent evaporation microencapsulation, solvent removal microencapsulation, and coacervation. These methods are known in the art. Detailed descriptions of the methods are discussed in Mathiowitz et al., "Microencapsulation", in Encyclopedia of Controlled Drug Delivery, vol. 2, pp. 495-546, 1999, John Wiley & Sons, Inc. New York, N.Y., which is incorporated by reference herein in its entirety.

In some embodiments, the IgY antibody specific for an antigen disclosed herein (e.g. *Enterococcus faecium*, *Enterococcus faecalis* or *Enterococcus faecalis* cytolysin toxin) is administered to the subject in a concentrated form. For example, in some embodiments, the IgY antibody is purified and concentrated before administration to the subject. Methods of purifying and concentrating IgY antibodies from egg products are known in the art and are described, for example, in U.S. Pat. No. 5,367,054, which is incorporated by reference herein in its entirety. In some embodiments, the hyperimmunized egg product comprises or consists of purified or partially purified IgY antibody to *Enterococcus faecalis* cytolysin toxin. In some embodiments, the hyperimmunized egg product comprises or consists of purified or partially purified IgY antibody to *Enterococcus faecalis*. In some embodiments, the hyperimmunized egg product comprises or consists of purified or partially purified IgY antibody to *Enterococcus faecium*. In some embodiments, the hyperimmunized egg product comprises or consists of purified or partially purified IgY antibody to *Enterococcus faecalis* and purified or partially purified IgY antibody to *Enterococcus faecalis* cytolysin toxin.

In some embodiments, the hyperimmunized egg products described herein are used to treat alcoholic liver disease in a subject that has already developed the disease. For example, in some embodiments, the subject has alcoholic liver disease at the time of administration of the hyperimmunized egg product. An increase in the proportion of *Enterococcus* spp. in patients with alcoholic liver disease (e.g. alcoholic hepatitis) relative to patients without an alcohol-use disorder has been observed. For example, in patients with alcoholic hepatitis, 5.59% of fecal bacteria were *Enterococcus* spp. compared with almost none (0.023%) in control subjects without an alcohol-use disorder. See Duan et al., 2019, Nature 575: 505-511. Accordingly, in some embodiments, at least 0.1%, 0.5%, 1%, 2%, 3%, 4% or 5% of fecal bacteria in the subject are *Enterococcus* spp. at the time of administration of the hyperimmunized egg product. Fecal samples from patients with alcoholic hepatitis have been shown to have about 2,700-fold more *E. faecalis* than samples from control subjects without an alcohol-use disorder, as measured by quantitative PCR (qPCR), and about 80% of patients with alcoholic hepatitis are positive for *E. faecalis* in their feces. See Duan et al., cited above. Accordingly, in some embodiments, the subject has at least 100-fold, 500-fold, 1000-fold, 1500-fold, 2000-fold, or 2500-fold more *E. faecalis* in a fecal sample relate to a subject that does not have alcoholic liver disease.

In some embodiments, the hyperimmunized egg products described herein are used to prevent development of alcoholic liver disease in a subject. For example, in some embodiments, the subject does not have alcoholic liver disease at the time of administration of the hyperimmunized egg product. In some embodiments, the subject has an alcohol related disorder other than alcoholic liver disease at the time of administration of the hyperimmunized egg product. In some embodiments, the subject is an alcohol abuser, an excessive drinker or a heavy drinker. In a particular embodiment, the subject to which the hyperimmunized egg product is administered is a human.

In some embodiments, the hyperimmunized egg products described herein are used to treat GVHD in a subject that has already developed the disease. For example, in some embodiments, the subject has GVHD at the time of administration of the hyperimmunized egg product. As discussed above, an increase in fecal levels of *Enterococcus* spp. (e.g. *E. faecium*) in patients with GVHD has been observed. See Garrett, cited above. Accordingly, in some embodiments, the subject having GVHD exhibits increased fecal levels of one or more *Enterococcus* spp. (e.g. *E. faecalis* or *E. faecium*) relative to a healthy subject (e.g. a subject that does not have GVHD) at the time of administration of the hyperimmunized egg product. In some embodiments, the subject having GVHD has received an organ transplant, a stem cell transplant, a bone marrow transplant, or an allogeneic hematopoietic cell transplant. In some embodiments, the subject has acute GVHD. In some embodiments, the subject has chronic GVHD.

In some embodiments, the hyperimmunized egg products described herein are used to prevent development of GVHD in a subject. For example, in some embodiments, the subject does not have GVHD at the time of administration of the hyperimmunized egg product. In some embodiments, the subject has received a transplant (e.g. an organ transplant, a stem cell transplant, a bone marrow transplant, or an allogeneic hematopoietic cell transplant) but has not yet developed GVHD. In a particular embodiment, the subject to which the hyperimmunized egg product is administered is a human.

The hyperimmunized egg product of the present invention is administered to a subject (e.g., a human) by any means that treats or prevents alcoholic liver disease or GVHD in the subject. In certain embodiments, administration occurs by oral administration. Egg and egg yolk are natural food ingredients and are non-toxic and safe. In other embodiments, the hyperimmunized egg product may be administered by injection, for example, intravenous, subcutaneous, or intramuscular injection. In a particular embodiment, the hyperimmunized egg product is purified or partially purified IgY that is administered by intravenous injection.

Any of several known pharmaceutical carriers can be used in the preparation of an injectable or otherwise administrable preparation, including phosphate buffered saline, saline, ethanol, propylene glycol and the like. In some embodiments, the hyperimmunized egg product is administered through drinking water.

In certain embodiments, the hyperimmunized egg product is administered as a composition comprising one or more additional compounds, e.g. a nutrient or probiotic. For example, in one embodiment, the hyperimmunized egg product of the invention is integrated into a dietary supplement. One method for preparing the egg of the invention to be incorporated into a dietary supplement involves drying the egg into an egg powder. Although various methods are known for drying eggs, spray drying is a preferred method. The process of spray drying eggs is well known in the art. In some embodiments, the composition is an aqueous solution comprising the hyperimmunized egg product.

In certain embodiments, whole eggs are divided into separate fractions such as egg yolks and egg whites. For example, it is generally known in the art that IgY antibody is found in egg yolks. Accordingly, those having ordinary skill in the art would clearly recognize that separation of egg yolks could provide more potent fractions or elimination of undesirable components, and would allow for other modes of administration such as administering hyperimmunized egg product parenterally, subcutaneously, intravenously, intramuscularly, intraperitoneally, intranasally, orally or topically. Such further separation will provide for the ability to make encapsulated products and compositions comprising said egg or fraction thereof.

The hyperimmune egg product is preferably administered to the subject in an amount that is immunologically effective in treating or preventing alcoholic liver disease or GVHD. Dosage and duration of the administration will depend upon the particular condition of the subject. In some embodiments, the hyperimmunized egg product is administered to the subject for at least 5, 6, 7, 8, 9, 10, 11, 12, 13, 14, 15, 20, 25, 30, 60, 90, 180 or 365 days. The hyperimmunized egg product may be administered to the subject 1, 2, 3, 4, 5, 6, 7, 8, 9, 10 or more times per day. Any of these values may be used to define a range for the number of times the hyperimmunized egg product may be administered to the subject per day. For example, in some embodiments the hyperimmunized egg product is administered to the subject 1-2 times per day, 1-3 times per day, or 1-4 times per day. In some embodiments, the hyperimmunized egg product is administered to the subject at least twice per day. In some embodiments, the hyperimmunized egg product is administered to subject at least once per day. In some embodiments, the hyperimmunized egg product is administered to the subject daily. In some embodiments, the hyperimmunized egg product is administered to the subject once every two days. In some embodiments, the hyperimmunized egg product is administered to the subject once every three days. In some embodiments, the hyperimmunized egg product is administered to the subject once per week. In a particular embodiment, the hyperimmunized egg product is administered to the subject once per day for more than 1, 2, 3, 4, 5, 6, 7, 8, 9 or 10 consecutive days.

In some embodiments, daily amounts ranging from less than one to several whole, hyperimmune eggs (or hyperimmune egg products containing the equivalent of less than one to several whole, hyperimmune eggs) can be administered to the subject depending on the particular circumstance of the condition. More potent fractions can be separated and concentrated by methods well-known in the art, from several hundred eggs. In certain embodiments, the effective amount of the hyperimmunized egg product administered to a subject (e.g., a human) is 0.1, 0.2, 0.3, 0.4, 0.5, 0.6, 0.7, 0.8, 0.9, 1, 2, 3, 4, 5, 20 6, 7, 8, 9, 10, 20, 30, 40 or 50 grams per day. For example, in some embodiments, 0.1, 0.2, 0.3, 0.4, 0.5, 0.6, 0.7, 0.8, 0.9, 1, 2, 3, 4, 5, 6, 7, 8, 9, 10, 20, 30, 40 or 50 grams per day of whole egg are administered to the subject. In some embodiments, 0.1, 0.2, 0.3, 0.4, 0.5, 0.6, 0.7, 0.8, 0.9, 1, 2, 3, 4, 5, 6, 7, 8, 9, 10, 20, 30, 40 or 50 grams per day of egg yolk are administered to the subject. In some embodiments, 0.1, 0.2, 0.3, 0.4, 0.5, 0.6, 0.7, 0.8, 0.9, 1, 2, 3, 4, 5, 6, 7, 8, 9 or 10 grams per day of dried egg yolk or dried whole egg are administered to the subject. Any of these values may be used to define a range for the effective amount of the hyperimmunized egg product administered to the mammal. For example, in some embodiments the effect amount of the hyperimmunized egg product is between 0.1 and 10 grams, between 0.5 to 6 grams, or between 1 and 5 grams per day. In a particular embodiment, 3 grams of egg yolk are administered to the subject (e.g. a human) per day.

In certain embodiments, the composition comprises at least 0.01%, 0.05%, 0.1%, 0.5%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 96%, 97%, 98% or 99% w/w of the hyperimmunized egg product. Any of these values may be used to define a range for the concentration of the hyperimmunized egg product in the composition. For example, in some embodiments, the composition comprises between 0.01% and 50%, between 0.1% and 50%, or between 1% and 50% w/w of the hyperimmunized egg product.

EXAMPLES

Example 1. Preparation and Evaluation of Anti-*Enterococcus faecalis* and Anti-Cytolysin IgY Antibodies The current study was designed to evaluate the effectiveness of hyperimmune egg containing targeted IgY antibodies against *E. faecalis* cytolysin toxin and *E. faecalis* when orally administered to a humanized mice ALD model that are colonized with bacteria form the feces of patients with alcoholic hepatitis. A schematic of the experiment is provided in FIG. 1.

Methods

Preparation of Hyperimmune Egg Powder

Two (2) mL of primary culture of *Enterococcus faecalis* was initiated from glycerol stocks. A large batch of culture was developed by inoculating with the primary culture at 0.2% in a 500 mL culture bottle and grown overnight at 37° C. with shaking at 180 rpm. Bacteria were pelleted by centrifugation at 6000 rpm at 4° C. The pellet was washed once with ice cold PBS. The pellet was again resuspended in ice cold PBS, transferred into a glass tube and was sonicated for 10 cycles at the highest setting for 30 minutes each cycle. The resulting lysate was centrifuged at 10,000 rpm at 4° C. for 15 min and the supernatant was collected. Total protein was quantified by BCA protein assay.

Preparation of Recombinant Cytolysin

Pure recombinant *E. faecalis* cytolysin toxin was prepared by Genscript USA, Piscataway, NJ.

Hyperimmunization Protocol

A mixture of *E. faecalis* bacterial lysate and *E. faecalis* cytolysin toxin were diluted to 2 mg/mL and 1 mg/ml in PBS, respectively, and were used as the inoculum. Separate chickens were immunized with each of the antigens using a 1:1 mixture of the inoculum and Freund's complete adjuvant. Immunizations were performed at 0, 4, 7, 14 and 28 days and eggs were collected.

Extraction of Antibody for Evaluation of Titer and Neutralization

IgY antibody was extracted from hyperimmunized eggs using a water dilution method. 100 µL of the yolk was diluted in 10 ml of water, mixed thoroughly, and centrifuged to pellet the lipids while the antibodies and other soluble egg proteins were extracted into the water phase. The water phase was used to evaluate titer determination by ELISA as described below.

For neutralization assays, IgY was extracted from hyperimmunized egg yolks by water dilution and a NaCl precipitation method. Four to five egg yolks were diluted at 1:10 ratio with water acidified to pH 5 using 0.5 M HCl and frozen overnight. Diluted egg yolk was thawed at 37° C. and centrifuged at 6000 rpm for 20 min to separate the lipids. The supernatant was filtered and mixed with 8.8% NaCl at pH 4 and allowed to precipitate for 2 h. IgY was separated from the precipitate by centrifugation and excess salt was removed by dialysis in PBS. Total IgY was quantified by A280 (absorption at 280 nm) values using a NanoDrop™ One Microvolume UV-Vis Spectrophotometer (Thermo Scientific). Purity of IgY was analyzed on an SDS-PAGE gel.

Detection of Antibody Specificity and Titer by ELISA

Antibody specificity and titer was determined by ELISA. Briefly, to determine anti-*E. faecalis* antibody titer, a 96 well plate was coated with 1 mg/mL of *E. faecalis* lysate in carbonate-bicarbonate buffer (pH 9.3) and incubated overnight at 4° C. The plate was washed once with PBS and blocked with 1% BSA in PBS for 1 h at 37° C. The plate was washed once with PBS containing 0.05 wt % Tween-20 (PBST) and treated with primary anti-*E. faecalis* antibody serially diluted on the plate for 1 h at 37° C. The plate was washed and treated with goat anti-chicken HRP secondary antibody. TMB substrate was added to develop the signal and the reaction was stopped by HCl. The plate was read at 450 nm on a plate reader. To determine anti-cytolysin antibody titer, another 96 well plate was coated with 0.5 mg/ml cytolysin and a similar experiment was performed using anti-cytolysin antibodies.

Test for Neutralization Abilities of IgY

*Enterococcus faecalis* was cultured overnight in BHI Broth to an $OD_{600}$ of 1.5 and was diluted 1:50 in the broth and incubated until $OD_{600}$ 0.3. Culture was further diluted further to $10^3$ cfu/ml in BHI broth and was treated with antibodies at 15 mg/ml. After 24 h incubation at 37° C., the cultures were serially diluted $10^4$ fold and plated on sterile plates and incubated at 37° C. for 12 hours. Cfu/mL was quantitated by counting the number of colonies using ImageJ Count particle's function. Percent inhibition of bacterial colony formation was calculated.

Figure 2:
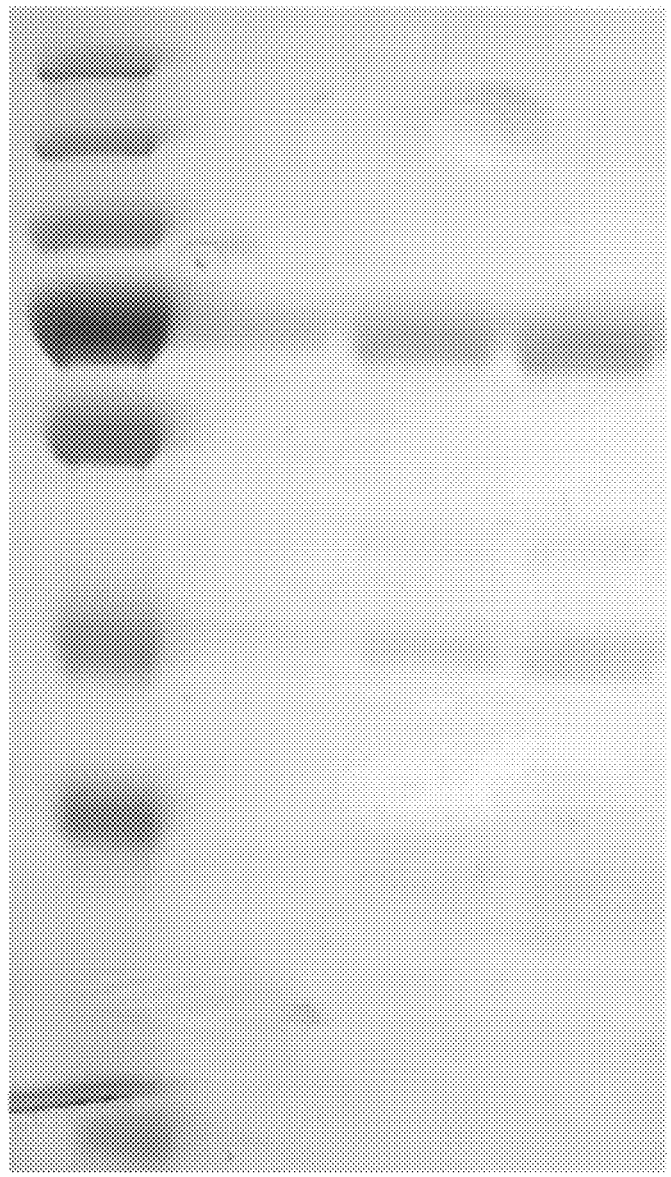
FIG. 2 shows the purity of anti-*Enterococcus faecalis* and anti-cytolysin IgY antibodies analyzed by SDS-PAGE electrophoresis. IgY has a molecular weight of 180 KDa and is composed of two subunits, a heavy-chain of 67 KDa and light-chain of 23 KDa, Lane 1 is a molecular weight ladder, lane 2, is an IgY standard, lanes 3 & 4 are 1 µg and 2 µg, respectively, of total soluble protein from egg yolk from chickens hyperimmunized with *Enterococcus faecalis* and cytolysin.

Results Total soluble proteins including IgY from hyper-immunized chicken egg yolks were extracted by water dilution and NaCl method. Purity of IgY was analyzed by SDS-PAGE electrophoresis under reducing conditions. IgY has a molecular weight of 180 KD and is composed of two subunits, a heavy-chain of 67 kDa and light-chain of 23 KD. The electrophoretic pattern of the IgY extracted from hyper-immunized egg yolks was similar to that of the IgY standard. See FIG. 2.

Evaluation of Target Specific Antibody Titer

Figure 3A:
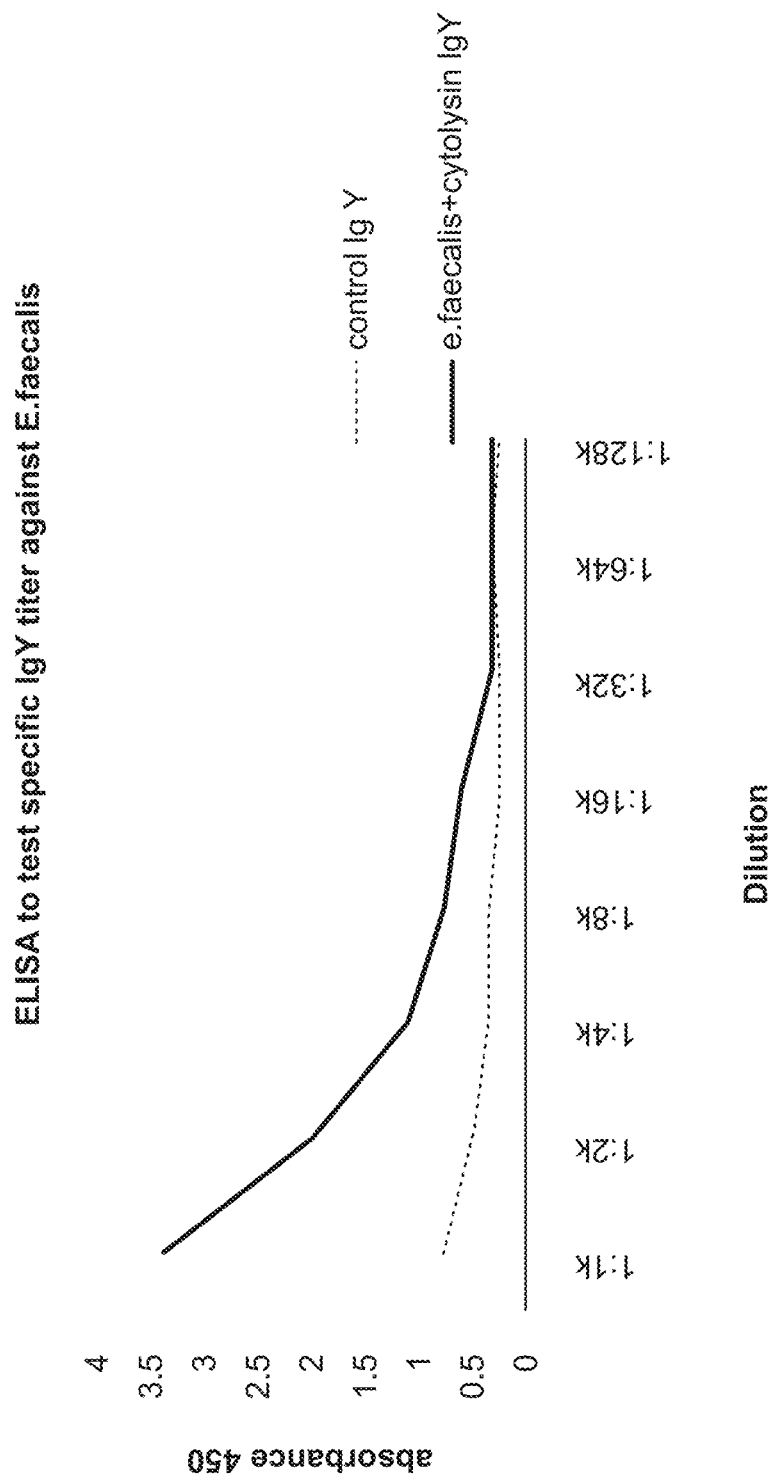
FIG. 3A shows *Enterococcus faecalis* specific activity of IgY from chickens immunized with *Enterococcus faecalis*+cytolysin.
Figure 3B:
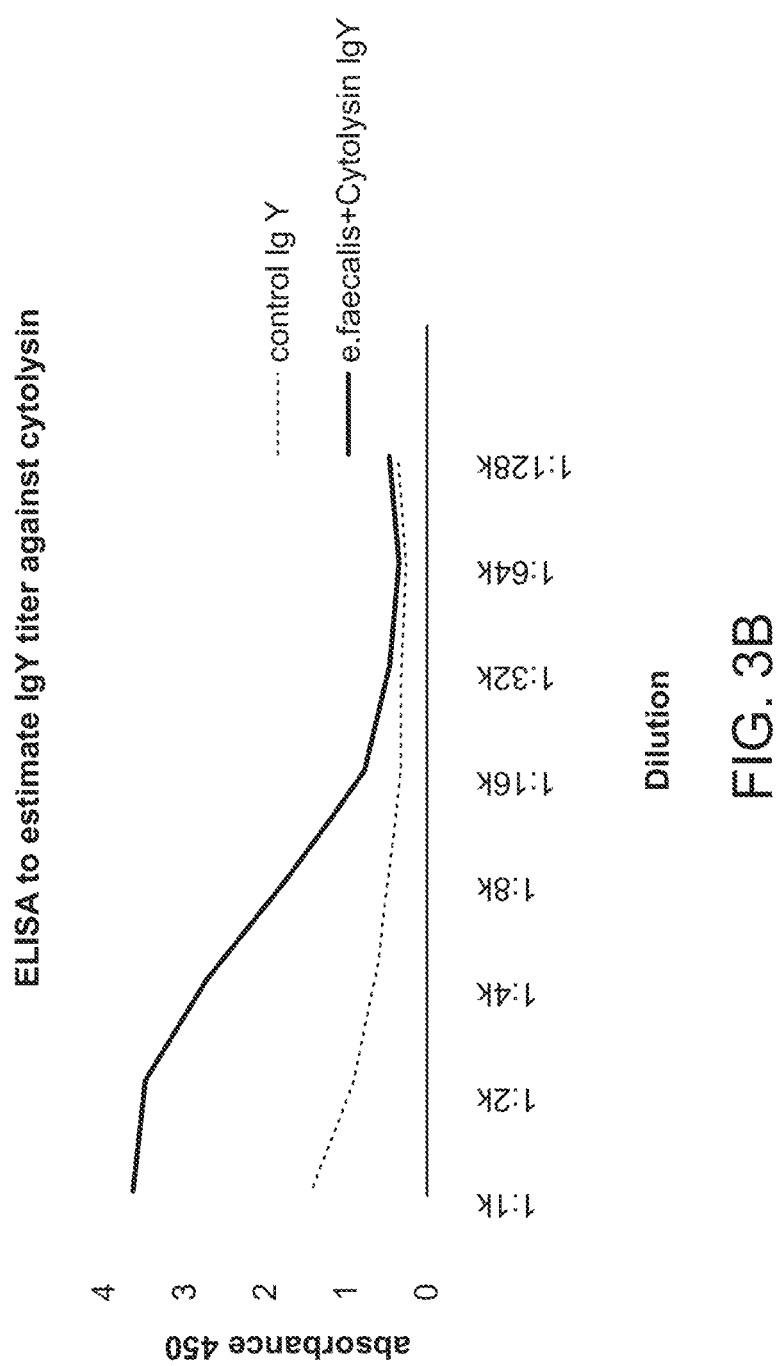
FIG. 3B shows cytolysin specific activity of IgY from chickens immunized with *Enterococcus faecalis*+cytolysin. IgY from non-immunized hens was used as the control IgY. Specific activity is represented by the antibody reactivity and titer.

Specific activity of IgY antibody against E. faecalis and cytolysin antigens was measured by indirect ELISA. ELISA results indicated positive binding of IgY to the specific antigens when compared to the control IgY with a high titer of 1:32,000. See FIGS. 3A and 3B.

Target Neutralization and Evaluation

Growth inhibitory effects of IgY antibodies on E. faecalis were investigated. Whole cell E. faecalis bacteria were incubated with 15 mg/ml of IgY, and cfu analysis was performed after 24 h incubation. Treatment with 15 mg/ml IgY inhibited by >70% the growth of E. faecalis as visualized by reduction in the number of colonies on the agar plate. See FIG. 4.

Figure 5:
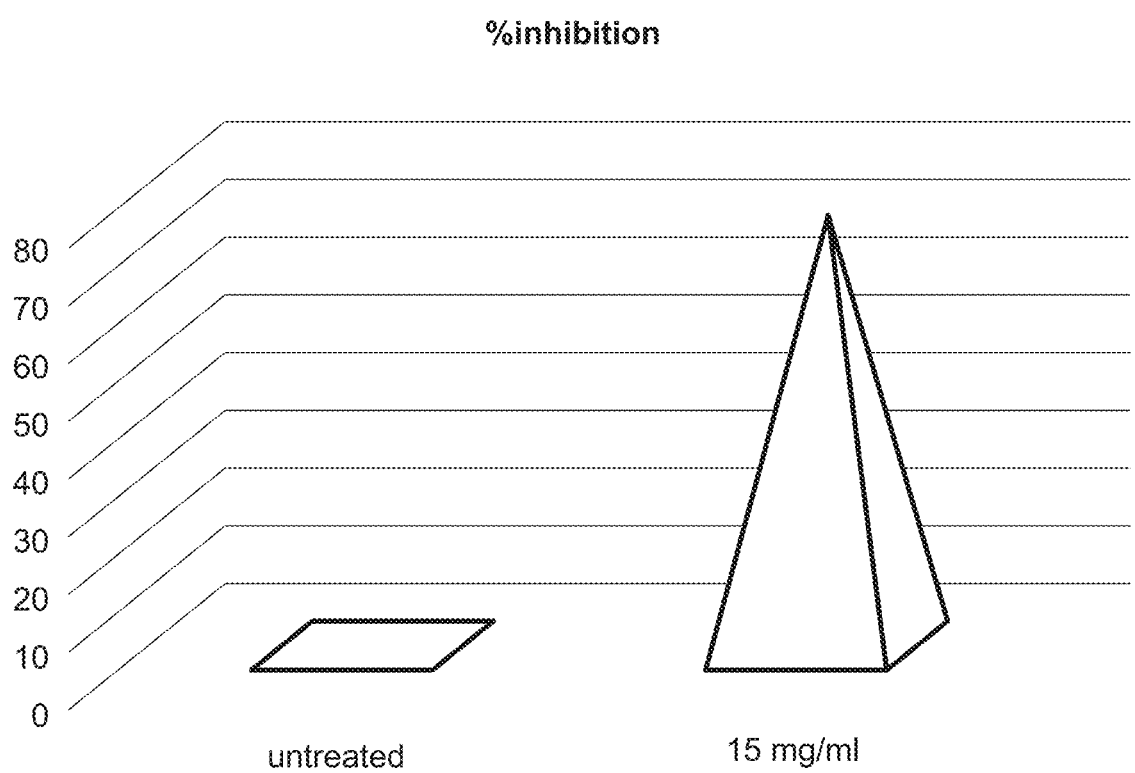
FIG. 5 shows quantification of cfu/ml in untreated and anti-*Enterococcus faecalis*+anti-cytolysin IgY treated *E. faecalis* culture. Percent inhibition was calculated.

The growth inhibitory effect of IgY on E. faecalis was quantitated, and the percent inhibition was plotted. See FIG. 5. Treatment of E. faecalis with anti-E. faecalis+cytolysin IgY antibody at 15 mg/ml concentration resulted in 75% inhibition of E. faecalis growth, indicating successful generation of neutralizing antibodies to E. faecalis. See FIG. 5.

Example 2. Effect of Oral Feeding of Anti-*Enterococcus faecalis* and Anti-Cytolysin IgY Antibodies in an Alcoholic Liver Disease Mouse Model Methods
Preparation of Egg Powder for Preclinical Studies Egg white and yolks were homogenized and freeze dried to create an egg powder. Egg powder was stored at 4° C. The freeze-dried egg powder was analyzed for antibody activity as described above in Example 1, and then evaluated in the humanized model of alcoholic liver disease (ALD) described below.

Stool samples from cytolysin-positive human patients with alcoholic hepatitis were used for fecal transplantation in germ-free mice. Mice were gavaged with 100 µl of stool samples (1 g stool dissolved in 30 ml Luria-Bertani (LB) medium containing 15% glycerol under anaerobic conditions), starting at an age of 5-6 weeks and repeated two weeks later. Two weeks after the second gavage, mice were placed on the ethanol or control (isocaloric) diet as described by Duan et al., 2019, Nature 575: 505-511. Periodically the mice were evaluated for serum ALT, liver pathology and other parameters such as weight gain, liver weight, and feed intake.

Alcoholic liver disease (ALD) model Male and female C57BL/6 germ-free mice were bred and fecal transplantation with stool samples from one cytolysin-positive human patient with alcoholic hepatitis was performed at the age of 5-6 weeks and repeated 2 weeks later as described by Duan et al., 2019, Nature 575: 505-511. Mice were fed with Lieber-DeCarli diet, and the caloric intake from ethanol was 0% on days 1-5 and 36% from day 6 until the end of the study period. At day 16, mice were gavaged with a single dose of ethanol (5 g/kg body weight) in the early morning and sacrificed 9 hours later. Pair-fed control mice received a diet with an isocaloric substitution of dextrose.

Egg powder containing control IgY (15 mg/day) from the eggs of non-immunized hens, or anti-E. faecalis+anti-cytolysin IgY (1, 5 or 15 mg per day) was added to the liquid diet (containing fat, carbohydrates, proteins and ethanol/isocaloric dextrose) at the start of the alcohol administration. See Table 1 below for dry egg powder weight. Diets were replaced every third day. Mice were randomly assigned into groups at the beginning of the study. There was no mortality in any of the groups during the ethanol feeding period.

TABLE 1

IgY doses for mouse ALD model

| Treatment Group | IgY Dose (mg) | Whole Egg Powder Dose (g) |
| --- | --- | --- |
| Anti- E. faecalis + anti-cytolysin IgY | 1 | 0.18 |
| Anti- E. faecalis + anti-cytolysin IgY | 5 | 0.88 |
| Anti- E. faecalis + anti-cytolysin IgY | 15 | 2.63 |
| Control IgY | 15 | 2.24 |

Biochemical Analysis

Serum levels of alanine aminotransferase (ALT; a test for liver damage) were measured using an Infinity ALT kit (Thermo Scientific). Hepatic triglyceride levels were measured using the Triglyceride Liquid Reagents Kit (Pointe Scientific).

Staining Procedures

Formalin-fixed tissue samples were embedded in paraffin (Paraplast plus, McCornick) and stained with hematoxylin-eosin (Surgipath).

Statistical Analysis

Results are expressed as mean±s.e.m. Numbers for biological replicates were n=5 in each ethanol-containing diet group. Significance was evaluated using One-way analysis of variance (ANOVA) with Tukey's post-hoc test. A P value <0.05 was considered to be statistically significant. Statistical analyses was performed using R statistical software, R version 1.3.1093, 2020 the R Foundation for Statistical Computing and GraphPad Prism v8.4.3.

Results

Figure 6:
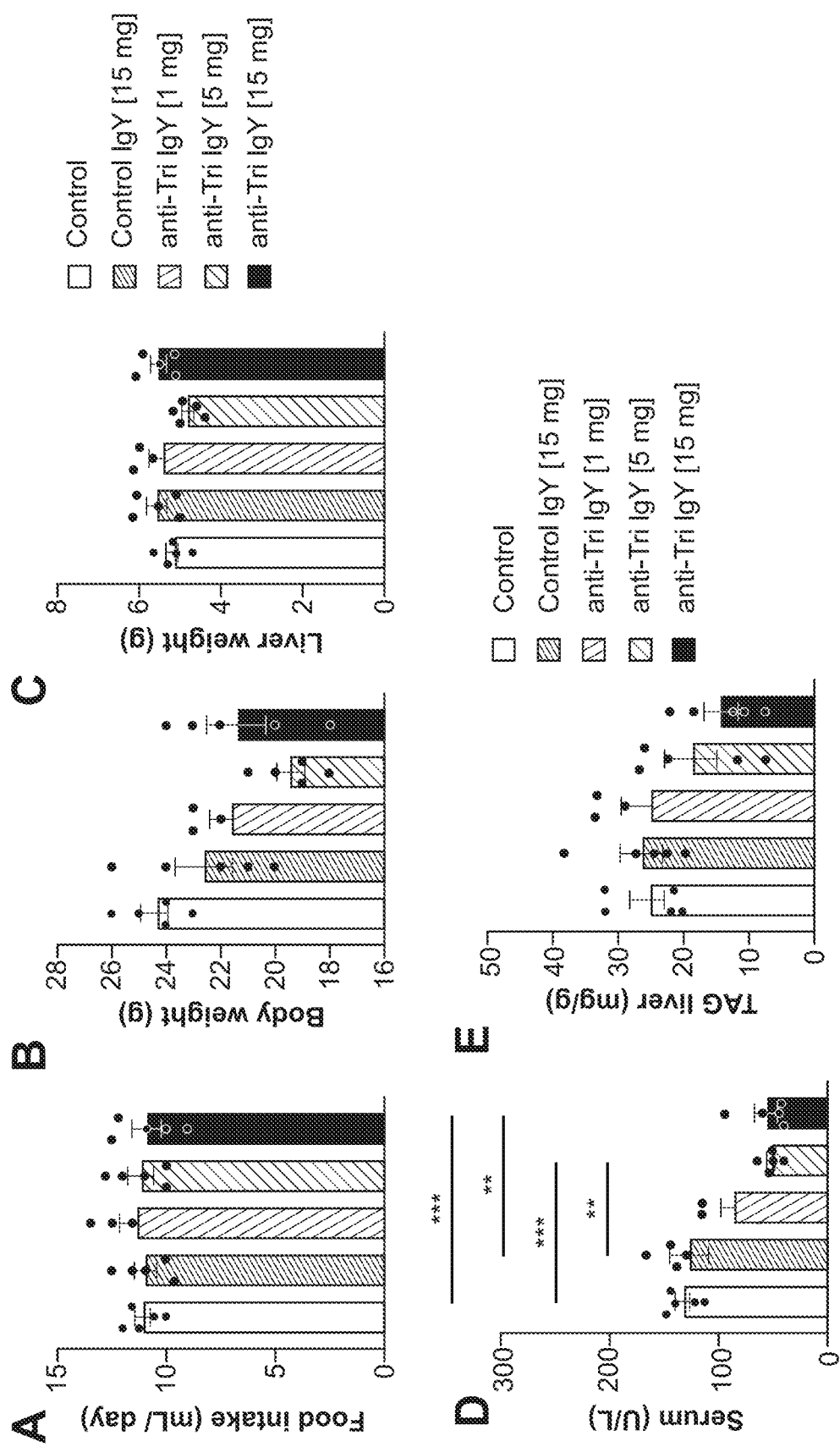
FIGS. 6A-6E show the effects of anti-*Enterococcus faecalis*+anti-cytolysin IgY administration in gnotobiotic mice subjected to the chronic-plus-binge ethanol feeding model. C57BL/6 germ-free mice were colonized with feces from a cytolysin-positive human patient with alcoholic hepatitis and subjected to the chronic-binge ethanol feeding model (n=5 per group), and given vehicle, control IgY and anti-*Enterococcus faecalis*+anti-cytolysin IgY in the liquid diet. (A) Food intake. (B) Body weight. (C) Liver weight. (D) Serum level of alanine aminotransferase (ALT). (E) Hepatic triglyceride (TAG, triacylglycerol) content. Results expressed as mean±s.e.m. P values were determined by One-way ANOVA with Tukey's post-hoc test. *P<0.05, P<0.01, *P<0.001
Figure 7:
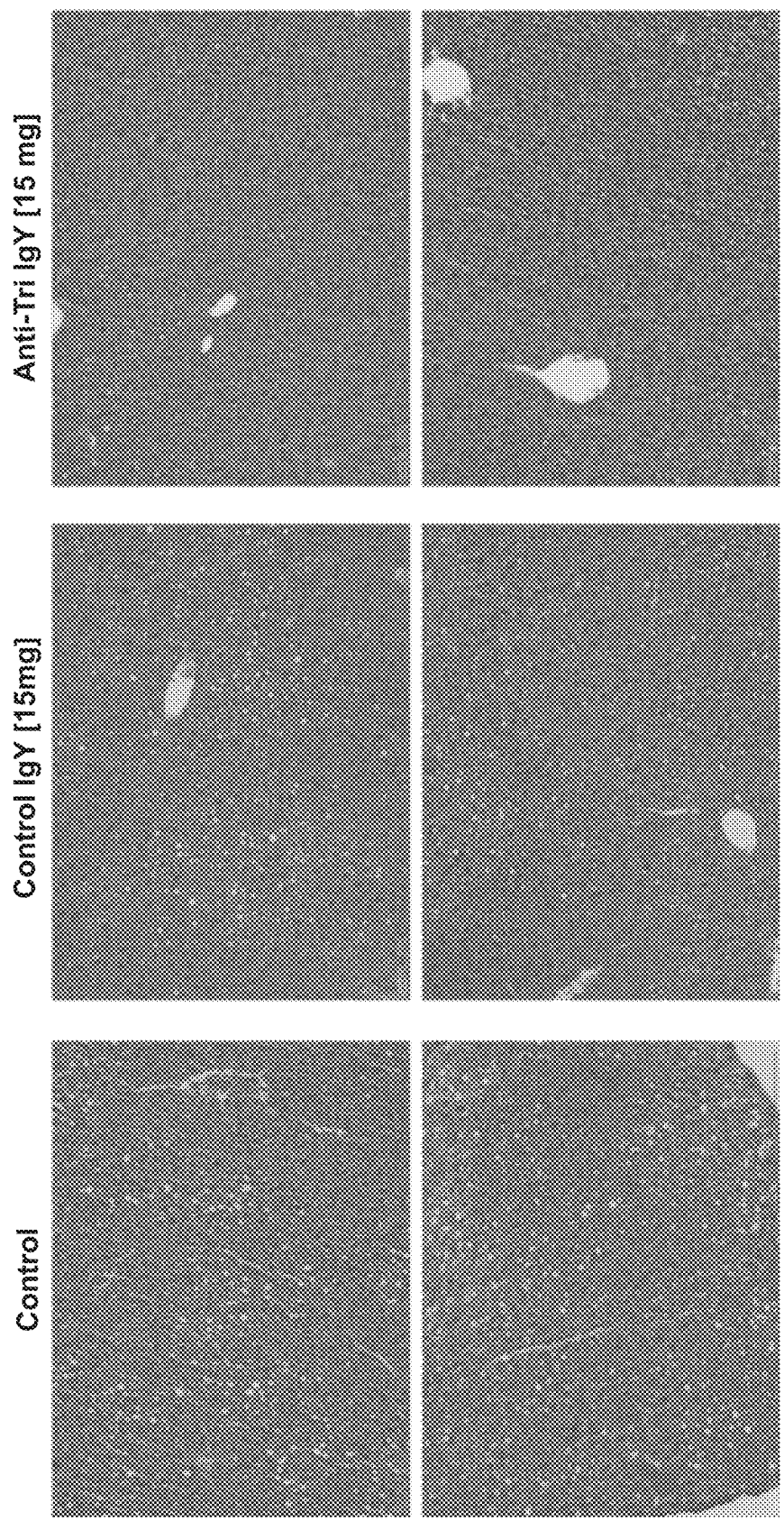
FIG. 7 shows the effects of anti-*Enterococcus faecalis*+anti-cytolysin IgY administration on the livers of gnotobiotic mice subjected to the chronic-plus-binge ethanol feeding model. C57BL/6 germ-free mice were colonized with feces from a cytolysin-positive patient with alcoholic hepatitis and subjected to the chronic-binge ethanol feeding model (n=5 per group), and given vehicle, control IgY or anti-*Enterococcus faecalis*+anti-cytolysin IgY in the liquid diet. Representative liver sections after hematoxylin and eosin staining are shown.

To determine the effect of anti-E. faecalis+anti-cytolysin IgY in a mouse model of ethanol-induced liver disease, germ-free C57BL/6 mice were colonized with stool from a cytolysin-positive patient with alcoholic hepatitis and subjected to the chronic-binge ethanol feeding model. Food intake, body and liver weight were not significantly different in ethanol-fed groups. See FIGS. 6A-6C. There was a trend toward lower body weight in the anti-E. faecalis+anti-cytolysin IgY treated mice, which is related to lower body weight at the beginning of the study. Mice receiving 5 mg or 15 mg anti-E. faecalis+anti-cytolysin IgY showed significantly less liver injury as indicated by a decreased serum level of alanine aminotransferase (ALT) as compared with mice receiving control IgY following chronic ethanol feeding (see FIG. 6D). No significant differences were seen in hepatic triglycerides, although there was a trend toward lower hepatic steatosis in the anti-E. faecalis+anti-cytolysin IgY treated mice (see FIG. 6E). Histological analysis showed that the anti-E. faecalis+anti-cytolysin IgY treated mice showed significantly less ethanol-induced liver injury and hepatic steatosis (see FIG. 7).

The invention claimed is:

1. A hyperimmunized egg produced by an animal that has been hyperimmunized with an antigen selected from the group consisting of *Enterococcus faecalis* that expresses cytolysin toxin, and isolated *Enterococcus faecalis* cytolysin toxin, wherein the level of antibodies to the *Enterococcus faecalis* cytolysin toxin in the hyperimmunized egg is increased relative to an egg from an animal that has not been hyperimmunized, and wherein the titer of antibodies to *Enterococcus faecalis* cytolysin toxin in the hyperimmunized egg is at least 8000.

2. The hyperimmunized egg of claim 1, wherein the animal has been hyperimmunized with:
   (a) *Enterococcus faecalis* that expresses cytolysin toxin; and
   (b) isolated *Enterococcus faecalis* cytolysin toxin, and
   wherein the level of antibodies to the *Enterococcus faecalis* and the isolated *Enterococcus faecalis* cytolysin toxin is increased relative to an egg from an animal that has not been hyperimmunized.

3. A pharmaceutical composition comprising egg yolk, egg yolk powder, or whole egg powder obtained from the hyperimmunized egg of claim 1, and a pharmaceutically acceptable carrier.

4. The pharmaceutical composition of claim 3 formulated for oral administration.

5. The pharmaceutical composition of claim 4, wherein the egg yolk, egg yolk powder, or whole egg powder is formulated in nanoparticles or in an emulsion.

6. An egg yolk obtained from the hyperimmunized egg of claim 1.

7. An egg yolk powder obtained from the hyperimmunized egg of claim 1.

8. A whole egg powder obtained from the hyperimmunized egg of claim 1.

9. The hyperimmunized egg of claim 1, wherein the animal has been further hyperimmunized with *Enterococcus faecium*.

10. The hyperimmunized egg of claim 1, wherein the animal has been hyperimmunized with isolated *Enterococcus faecalis* cytolysin toxin.

* * * * *

SEQUENCE LISTING

<160> NUMBER OF SEQ ID NOS: 2

<210> SEQ ID NO 1
<211> LENGTH: 38
<212> TYPE: PRT
<213> ORGANISM: Enterococcus faecalis

<400> SEQUENCE: 1

```
Thr Thr Pro Val Cys Ala Val Ala Ala Thr Ala Ala Ala Ser Ser Ala
1               5                   10                  15

Ala Cys Gly Trp Val Gly Gly Gly Ile Phe Thr Gly Val Thr Val Val
            20                  25                  30

Val Ser Leu Lys His Cys
        35
```

<210> SEQ ID NO 2
<211> LENGTH: 21
<212> TYPE: PRT
<213> ORGANISM: Enterococcus faecalis

<400> SEQUENCE: 2

```
Thr Thr Pro Ala Cys Phe Thr Ile Gly Leu Gly Val Gly Ala Leu Phe
1               5                   10                  15

Ser Ala Lys Phe Cys
            20
```